May 14, 1940.  O. H. DICKE ET AL  2,200,857
INTERLOCKING SYSTEM FOR RAILROADS
Filed Oct. 31, 1932  6 Sheets-Sheet 2

INVENTORS
O.H. Dicke and F.B. Hitchcock,
BY
THEIR ATTORNEY.

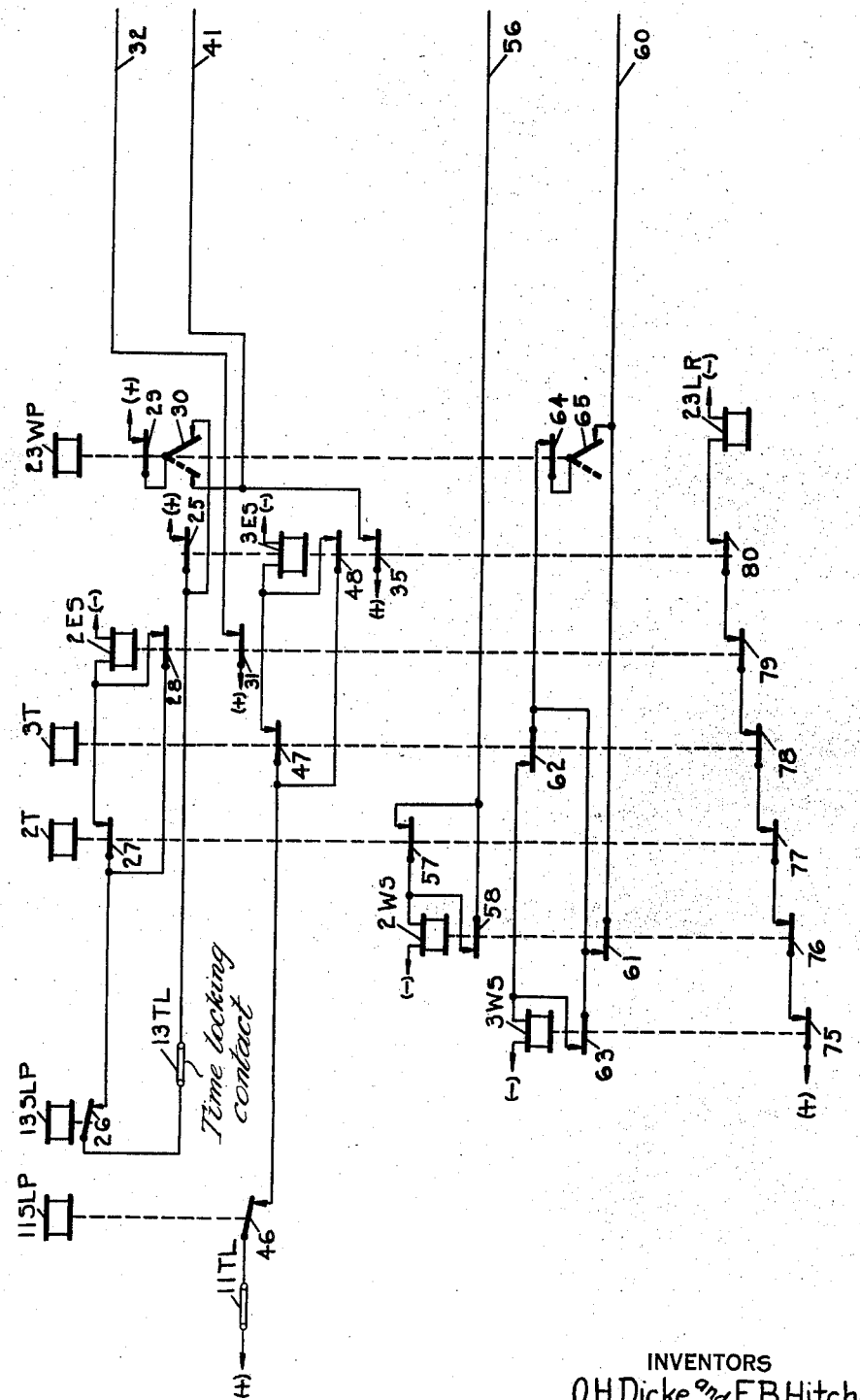

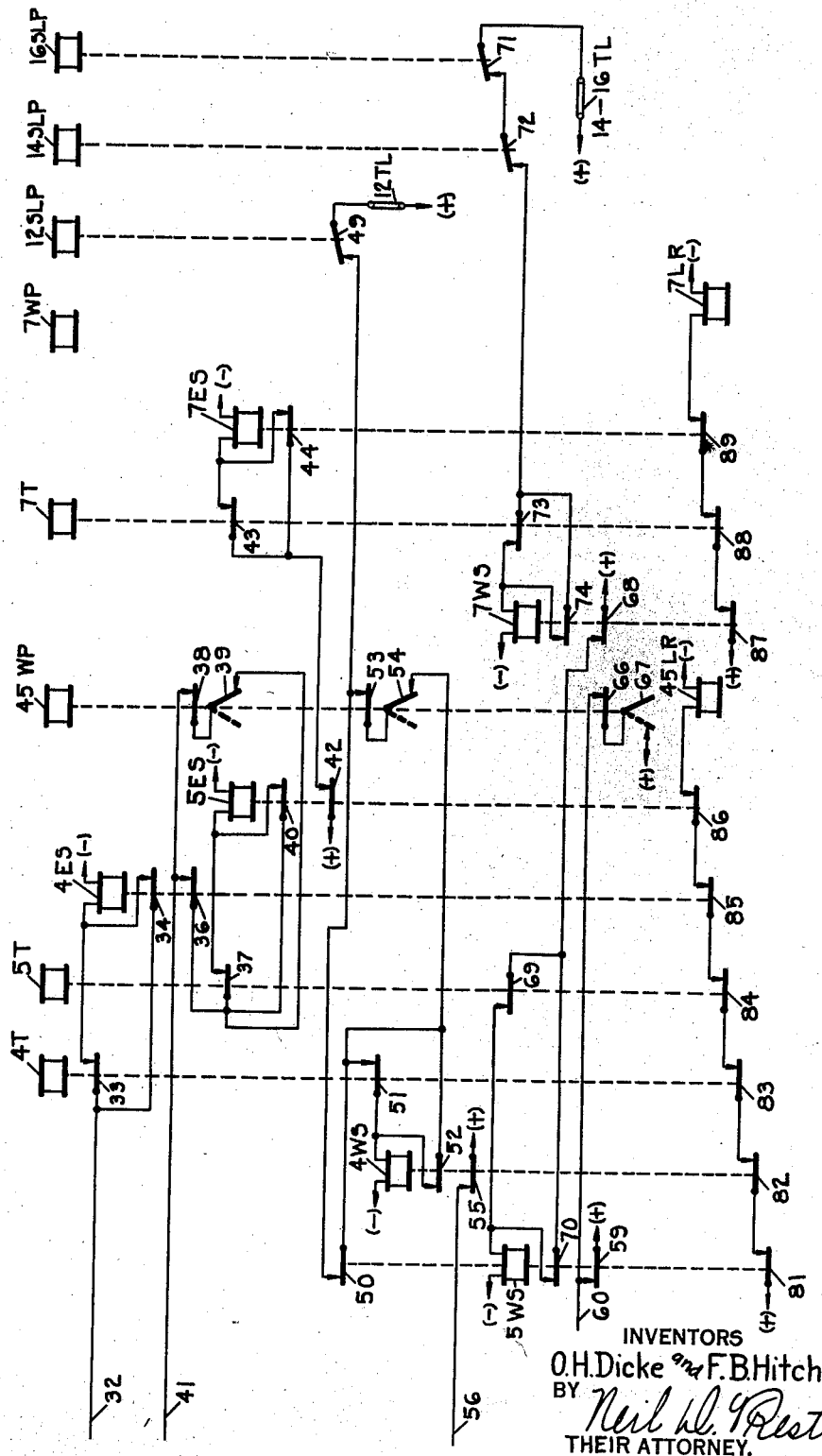
FIG. 3.B.

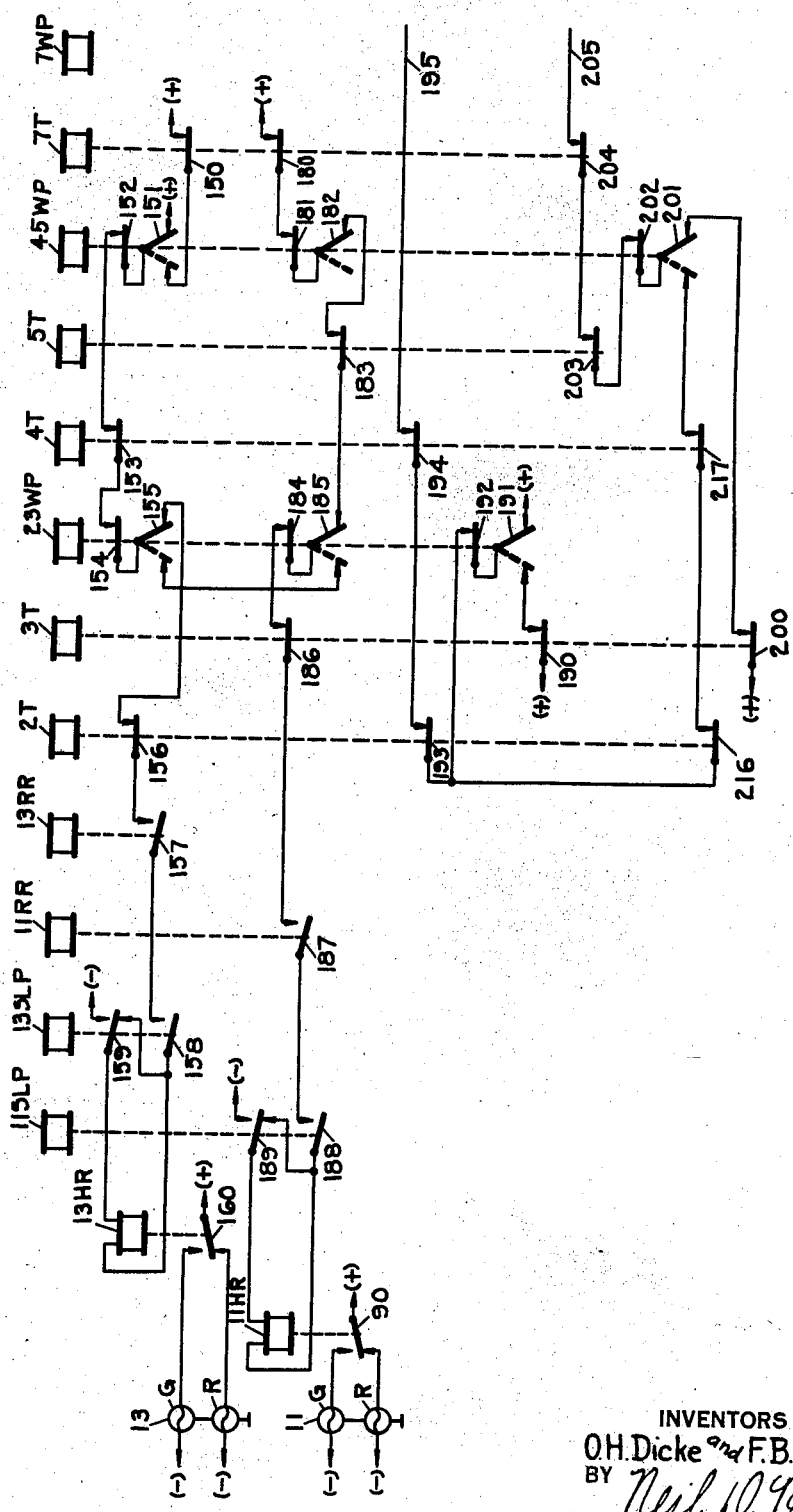
Fig. 4.A.

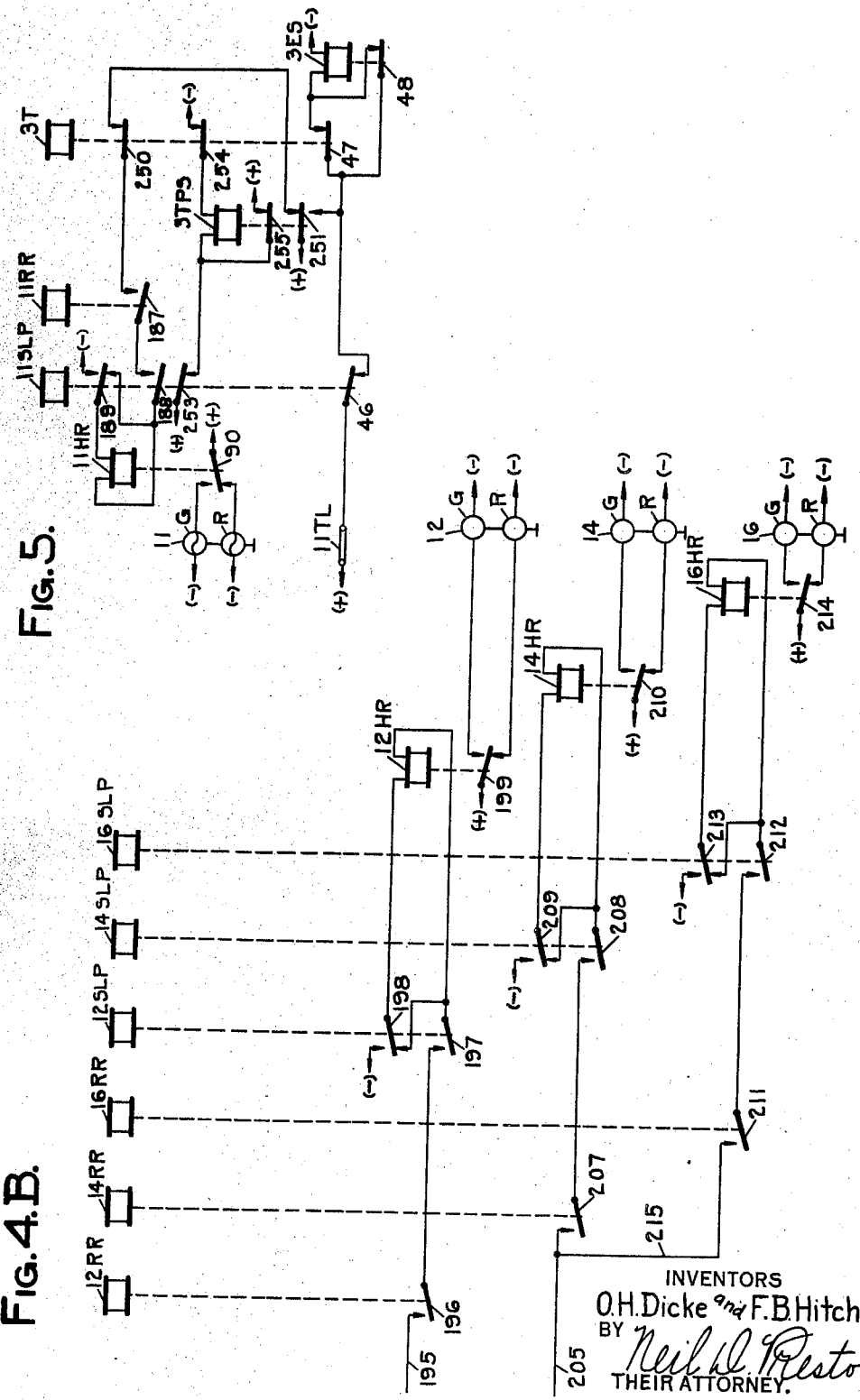

Patented May 14, 1940

2,200,857

UNITED STATES PATENT OFFICE 2,200,857

INTERLOCKING SYSTEM FOR RAILROADS

Oscar H. Dicke and Forest B. Hitchcock, Rochester, N. Y., assignors to General Railway Signal Company, Rochester, N. Y.

Application October 31, 1932, Serial No. 640,378

27 Claims. (Cl. 246—134)

This invention relates to interlocking systems for railways, and more particularly pertains to a system in which all of the interlocking between the traffic controlling devices is accomplished by circuit isolation.

In one type of electric interlocking system, the setting up of a particular route through the track layout results in the establishment of a route circuit which has circuit portions to conform precisely with the various mechanical portions of the track layout. The route circuit, thus established, is then employed for determining the direction of traffic over the corresponding route by the polarity of its energization.

In systems of this character, it is further provided that the electrical route circuit portions are not completed until the track switches in the corresponding route are actually locked. In other words, a lock relay, which is normally energized whenever it is safe for a track switch to be operated, but is deenergized whenever a track switch should be maintained in its last operated position, is associated with each track switch and is provided with back contacts that are included in those electrical route circuit portions which are associated with those routes that may be set up over the corresponding track switch. Such a locking of the track switches, upon the clearing of a signal when a route circuit has been completed, prevents the response of each track switch in that route to its control lever.

It has previously been the practice to provide that a track switch must be unlocked at the time of the actuation of its control lever in order to be operated to a new position. However, the present invention provides what may be conveniently termed preconditioning of routes, that is, when a particular route has been set up, a conflicting route may be prepared or preconditioned by properly positioning the control levers therefor, although the corresponding traffic controlling devices do not actually respond until a train has passed through the first route or until such route has been manually restored. In a system of this character, the switch machine control levers for the switches in a particular route that is set up, may be operated to new positions while such switches are locked and when such switches become unlocked, they will respond to the new positions of their control levers. This preconditioning of the switch machine control levers is accomplished without in any way effecting a change in the route circuit portions of the route already set up.

Such preconditioning of routes provides added facility at junction points where it is desired to have train movements occur as rapidly as possible in accordance with the signaling system, and yet not to require the instant attention of the operator.

The present invention provides these features of preconditioning of routes in such a manner that each switch individually responds to its prepositioned control lever immediately after the passage of a train over it although such train has not entirely passed through the route over which it is traveling. In other words, rear release route locking is provided, that is, a particular route is set up by positioning its switches and clearing its governing signal, and this route cannot be changed once a train has passed beyond the governing signal, although, as the train passes beyond each track switch included within that route, that track switch is released so as to be operated in response to its control lever in readiness for another route in which it may be included.

If desired, such rear releasing of a route may be possible only after the return of the signal control lever for that route to a stop position. The present invention provides that the above feature may be employed, but also provides that the rear release of a route may be accomplished after the automatic putting to stop of the governing signal of a route independently of the position of the signal control lever therefor.

Other objects, purposes and characteristic features of the present invention will be in part obvious from the drawings, and in part pointed out, as the description of the invention progresses.

In describing the invention in detail, reference will be made to the accompanying drawings, in which like reference characters designate corresponding parts throughout the several views, in which the like letters in such distinctive reference characters designate similar functions for the corresponding devices with the distinctiveness made apparent by the use of distinctive preceding numerals, in which like numerals when applied to distinctive letters represent their inclusion within a particular group of devices, and in which:

Figs. 1, 2, 3A, 3B, 4A and 4B when considered together as hereinafter explained, constitute an interlocking system arranged in accordance with the present invention as applied to a simple track layout including two cross-overs and a single turn-out; and Fig. 5 illustrates a modified form which may be applied to the interlocking system above mentioned.

Instead of showing a complete circuit arrangement by placing a large number of sheets side by side, a simplified method of disclosure has been employed wherein all of the control circuits for any one relay are shown in a single drawing, while all of the circuits which that relay may control are distributed between the several drawings by showing that relay in block form in such drawings.

With the above idea of arrangement in mind, it may be stated that,

Figure 1:
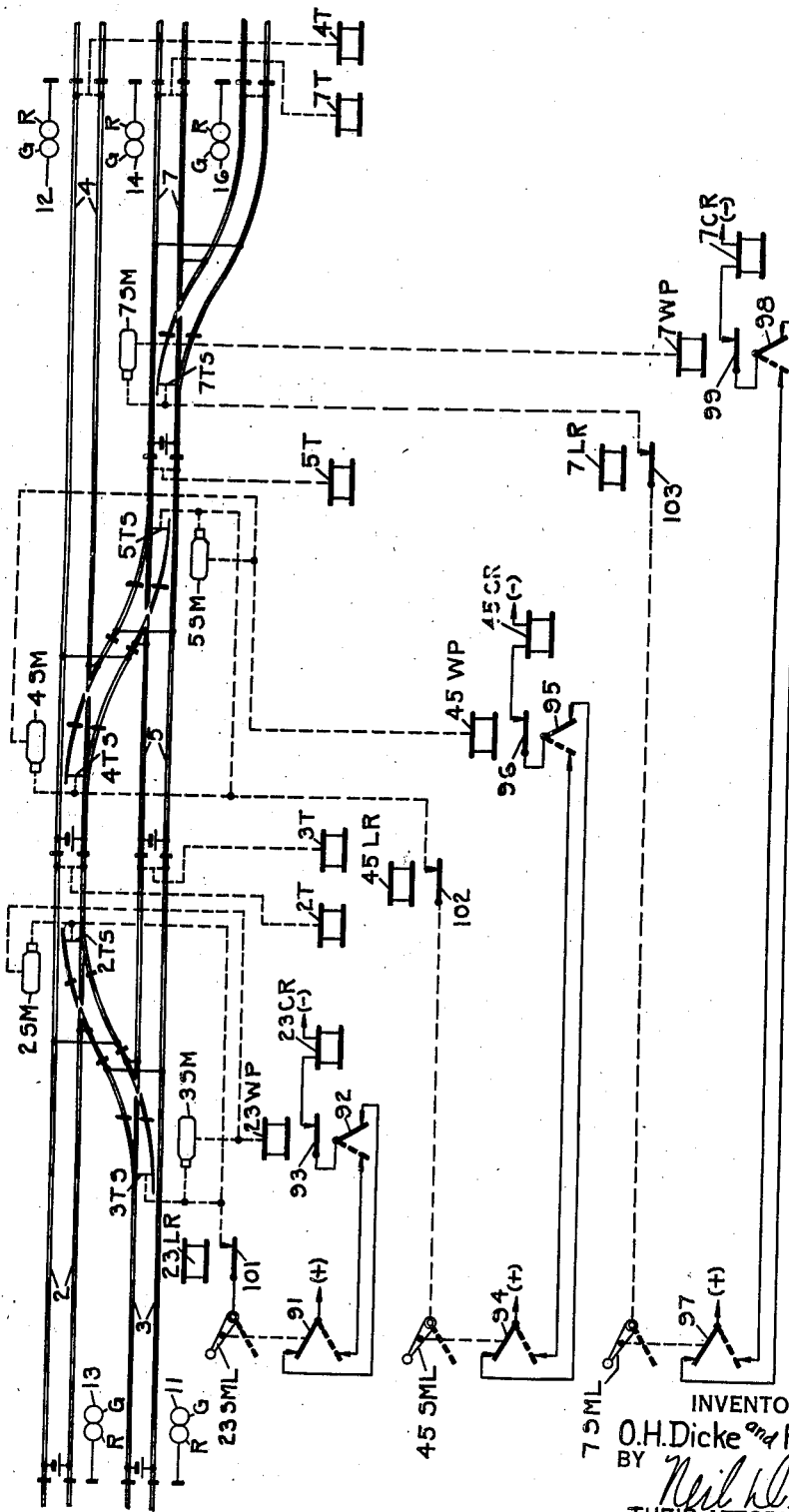
Fig. 1 illustrates the track layout including the switches, switch machines and signals, as well as the indicated switch control and indication circuits.

Figs. 3A and 3B, when placed end to end, illustrate the locking circuits for the track switches.

Figs. 4A and 4B, when placed end to end, illustrate the signal selecting circuits.

For the purpose of further simplifying the illustration and facilitating in the explanation thereof, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be employed in practice.

The various relays and their contacts are illustrated in a conventional manner and symbols are employed to indicate connections to the terminals of batteries or other suitable source of electric current instead of showing all of the wire connections to these terminals.

The symbols (+) and (—) are employed to indicate the positive and negative terminals respectively of suitable batteries, or other sources of electric energy; and those circuits with which these symbols are used are presumed to have current flowing from the positive terminal designated by (+) to the negative terminal designated by (—). The symbols employed with any one circuit presumably designate the terminals of the same battery, or other source. If alternating current is employed, then these symbols should be considered to represent the instantaneous relative polarities of the respective terminals.

APPARATUS

In the accompanying drawings, the invention has been shown applied to a simple track layout including a stretch of double track having two cross-overs and one turn-out track; but it should be understood that the invention is not limited, as thus shown, to the control of the switches and signals of such a simple layout, but may be extended for any desired number of switches and signals and may be readily applied to all types of track layout commonly found in interlocking plants, junction points, terminals or any other location where the routing of trains by a central operator is desired.

The stretch of double track includes a westbound track having track sections 2 and 4, and an eastbound track having track sections 3, 5 and 7. The track sections 2 and 3 are interconnected by a cross-over having track switches 2TS and 3TS; and similarly, the track sections 4 and 5 are interconnected by a cross-over having track switches 4TS and 5TS. The track section 7 is shown as having a track switch 7TS for connecting a turn-out track to the eastbound track. It is to be understood of course that traffic may travel in both directions over any of the tracks, but for convenience in the description, the main tracks have been termed east and westbound tracks.

The track switches 2TS, 3TS, 4TS, 5TS and 7TS are preferably operated by suitable power switch machines 2SM, 3SM, 4SM, 5SM and 7SM respectively. These switch machines may be of any suitable type, such for example as disclosed in the patent to W. K. Howe, Patent No. 1,466,903 dated September 4, 1923. The switch machines are remotely controlled by an operator located in a tower through suitable control circuits represented for the purpose of the present disclosure by a dotted line extending from the respective switch machine to its control lever in the tower, and may be controlled by a switch control relay as shown in Patent No. 2,027,569 referred to in the application of Larry et al. Ser. No. 577,504, which application has now matured into Patent No. 2,125,242 dated July 26, 1938. More specifically, the switch machines 2SM and 3SM are both controlled by a switch machine control lever 23SML; and similarly, the switch machines 4SM and 5SM are both controlled by the switch machine control lever 45SML. The switch machine 7SM is controlled by the switch machine control lever 7SML. Although the opposite ends of each cross-over are shown controlled from a single lever, in accordance with the usual practice, individual control may be employed if desired. The control circuits for the switch machines may be of any suitable type which may be interrupted for the locking of the switch machines, but which upon their reclosure will immediately allow the corresponding switch machine to respond to the then positions of their control levers.

It may be well to note here, that the type of layout may be arranged as desired, that is, the layout may be of the usual interlocking type where the operator and the controlling apparatus are located at or adjacent the track layout, or the arrangement may be of the remote type.

In actual practice, some of the signal relays, devices and the like may be located along the trackway, while other devices may be located in the tower, but for convenience in describing the present invention, it is assumed that the control levers for the switches and signals together with their various associated controlling circuits and relays are located in the tower, and that suitable control circuits are provided for remotely connecting the tower with the traffic controlling devices. It is to be understood of course, that any suitable distribution of the apparatus may be made without affecting the system of the present invention in its operation and usefulness.

Although various signal arrangements might be provided for the track layout chosen for the embodiment of the present invention, the specific signaling arrangement chosen is illustrated in Fig. 1, where the signals 11 and 13 govern the eastbound traffic over the east and west main tracks, while the signals 12, 14 and 16 govern the westbound traffic over the east and west main tracks and the turn-out track respectively. These signals are indicated as being of the color light signal type but may be of any other type, or may be any other suitable signaling means for regulating traffic movements.

The control levers are preferably mounted upon a suitable control panel with indicating lamps, miniature track switches located on a track diagram and such other devices which may be associated with such a control panel to facilitate in the handling of traffic. On this control panel, the switch machine levers 23SML, 45SML and 7SML (see Fig. 1) are suitably located adjacent their corresponding miniature track switches (not shown) so as to readily identify the particular switches with which they are associated. Also, the signal levers 11SL, 13SL, 12SL, 14SL and 16SL (see Fig. 2) are suitably located on the control panel for governing their respective signals 11, 13, 12, 14 and 16 (see Figs. 1, 4A and 4B).

The condition of occupancy of the various track sections 2, 4, 3, 5 and 7 are repeated in the tower by track relays 2T, 4T, 3T, 5T and 7T respectively see Fig. 1). In other words, the track relays are indicated by the letter reference character T and indicated as being associated with their respective track sections as designated by the preceding numerals. The track sections into which the track has been divided are assumed to have track circuits of the closed circuit type, so that the track relays are normally picked up or energized.

The position of the track switches is indicated in the tower by the provision of suitable switch repeating relays indicated by the reference characters WP and associated with the particular track switches as indicated by their preceding numerals (see Fig. 1). For example, as the track switches 2TS and 3TS are both controlled by the switch machine lever 23SML, only one switch repeating relay 23WP is required, which of course, is dependent upon both of the track switches 2TS and 3TS being in corresponding locked positions. Each switch repeating relay WP is of the polar neutral type and is energized with a current of a particular polarity depending upon the particular position and locked condition of its corresponding track switch or switches, and whenever a track switch is unlocked, the corresponding switch repeating relay WP is deenergized. For convenience, it is assumed that the track switches are in their normal positions and locked so as to energize the switch repeating relays WP with suitable potentials to actuate their polar contacts to right hand positions and to actuate their neutral contacts to energized positions.

The switch repeating relays WP are associated with their respective switch control levers in such a manner that a correspondence relay is provided for each switch control lever (see Fig. 1). These correspondence relays are represented by the letter reference characters CR and are associated with the particular track switch and control lever as indicated by their preceding numerals. These correspondence relays are of the usual neutral type.

Figure 2:
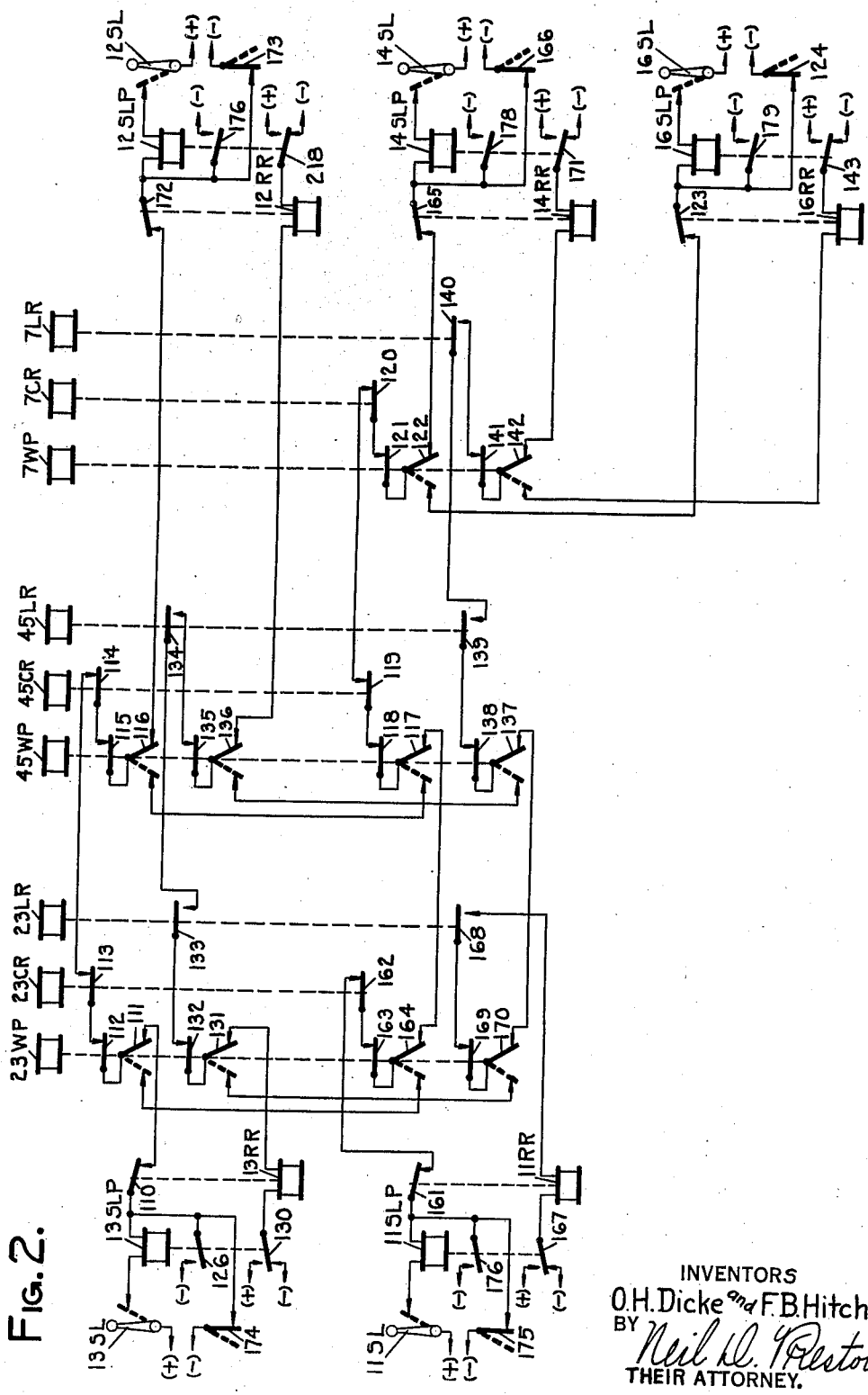
Fig. 2 illustrates the route circuit portions which conform to the mechanical layout of the trackway.

Each of the signal control levers SL is provided with a lever repeating relay designated by the letter reference character SLP and associated with the particular lever as indicated by the preceding numeral (see Fig. 2). Also, associated with each signal lever is a route relay designated by the letter reference characters RR and indicated as associated with the corresponding signal lever by its preceding numeral.

Associated with each track section between opposing signals are two directional stick relays, one for eastbound traffic and the other for westbound traffic. More specifically, the east and west stick relays are designated by the letter reference characters ES and WS respectively with suitable preceding numerals to designate the particular track sections with which they are associated (see Figs. 3A and 3B). These directional stick relays provide the route locking for the track switches together with the rear releasing of such track switches upon the passage of a train over each track switch individually.

A lock relay designated by the letter reference characters LR is associated with each track switch as indicated by their preceding numerals. These locking relays LR are normally energized but whenever a route is set up and the signal therefor has been cleared, the lock relays for the track sections in such route are deenergized preventing the control of their corresponding track switch machines by their control levers (see Fig. 1).

In accordance with the present invention, it is contemplated that suitable approach locking and time release therefor may be associated with each of the signals, if desired. This has been indicated in the drawings by jumpers given the reference characters TL with suitable preceding numerals to designate the signals with which they are associated (see Figs. 3A and 3B). In other words, these jumpers TL may be considered as time locking contacts which are opened whenever the corresponding signal is cleared and closed only a predetermined time after such signal has been put to stop providing there is a train in advance of said signal. If however, there is no train in advance of a particular signal, the time locking contact TL for that signal closes immediately upon the putting to stop of that signal. Such approach locking and time releasing therefor has been shown in numerous applications, as for example, in the application of Larry et al., Ser. No. 577,504, filed November 27, 1931, now Patent No. 2,125,242 dated July 26, 1938. Although suitable points of insertion for suitable approach locking having been illustrated, the operation of such locking and time release therefor will be omitted in the description of the present embodiment.

Each of the signals is controlled by its respective home relay HR which is selected by the signal lever repeating relays, route relays, track relays and switch repeating relays. The particular signal with which a relay HR is associated is indicated by its preceding numeral (see Figs. 4A and 4B).

In the modified form of the present invention illustrated in Fig. 5, a track repeating stick relay TPS is provided and is indicated as being for the track section 3 by making its reference character 3TPS. In considering the modified features in Fig. 5, it is to be understood that the arrangement shown is only a fragmentary part of the system intended to be disclosed, and that the remaining corresponding parts of the embodiment shown in Figs. 1, 2, 3A, 3B, 4A and 4B should be similarly arranged and modified in order to accomplish the features provided in connection with this modified form.

It is believed that the characteristic features and purposes of the present invention will be best understood by further description being given from the standpoint of typical operations.

OPERATION

*Normal conditions.*—Although the track switches TS are usually left in their last operated positions, they have been shown as being in their normal positions in correspondence with their respective switch machine control levers SML. The signal control levers SL, however, are usually returned to normal "at-stop" positions, as shown, so that the corresponding signals display stop indications.

With the track sections unoccupied, the track relays T are normally energized with their contacts picked up, which condition has been merely indicated in the drawings.

The switch repeating relays WP are energized in accordance with the normal positions of their respective track switches TS, as above mentioned.

As the signal control levers SL are all in their at-stop positions and the track sections are unoccupied, the pick-up circuits and stick circuits for all of the directional stick relays are closed, as pointed out below (see Figs. 3A and 3B).

A pick-up circuit for the directional stick relay 2ES is closed from (+), through a circuit including front contact 25 of relay 3ES, time locking contact 13TL, back contact 26 of relay 13SLP, front contact 27 of track relay 2T, windings of relay 2ES, to (—). An auxiliary stick circuit for this relay 2ES is closed by its front contact 28 completing a shunt circuit around the front contact 27 of the track relay 2T. A holding circuit for relay 2ES is closed from (+), through front contact 29 of relay 23WP, polar contact 30 of relay 23WP in a right hand position, around the contact 25 of relay 3ES to render it ineffective to control the relay 2ES when the track switches 2TS and 3TS are in normal positions.

A pick-up circuit for the directional stick relay 4ES is closed from (+), through a circuit including front contact 31 of relay 2ES, wire 32, front contact 33 of relay 4T, windings of relay 4ES, to (—). An auxiliary stick circuit for this relay 4ES is closed by its front contact 34 completing a shunt circuit around the front contact 33 of the track relay 4T.

A pick-up circuit for the directional stick relay 3ES is closed from (+), through a circuit including the time locking contact 11TL, back contact 46 of relay 11SLP, front contact 47 of relay 3T, windings of relay 3ES, to (—). An auxiliary stick circuit for this directional stick relay 3ES is closed by its front contact 48 completing a shunt circuit around the front contact 47 of track relay 3T.

A pick-up circuit for the directional stick relay 5ES is closed from (+), through a circuit including front contact 35 of relay 3ES, wire 41, front contact 36 of relay 4ES, front contact 37 of relay 5T, windings of relay 5ES, to (—). An auxiliary stick circuit for this directional stick relay 5ES is closed by its front contact 40 completing a shunt circuit around the front contact 37 of the track relay 5T. A holding circuit for relay 5ES is closed by the front contact 38 of relay 45WP and the polar contact 39 of relay 45WP in a right hand position completing a shunt circuit around front contact 36 of relay 4ES to render the relay 4ES ineffective to control the relay 5ES when the track switches 4TS and 5TS are in normal positions.

A pick-up circuit for the directional stick relay 7ES is closed from (+), through a circuit including front contact 42 of relay 5ES, front contact 43 of track relay 7T, windings of relay 7ES, to (—). An auxiliary stick circuit for this directional stick relay 7ES is closed by its front contact 44 completing a shunt circuit around the front contact 43 of the track relay 7T.

A pick-up circuit for the directional stick relay 4WS is closed from (+), through a circuit including closed time locking contact 12TL, back contact 49 of relay 12SLP, front contact 50 of relay 5WS, front contact 51 of track relay 4T, windings of relay 4WS, to (—). An auxiliary stick circuit for this directional stick relay 4WS is closed by its front contact 52 completing a shunt circuit around the front contact 51 of the track relay 4T. A holding stick circuit for relay 4WS is closed by the front contact 53 of relay 45WP and the polar contact 54 of relay 45WP in a right hand position completing a shunt circuit around front contact 50 of relay 5WS to render the relay 5WS ineffective to control the relay 4WS when the track switches 4TS and 5TS are in normal positions.

A pick-up circuit for the directional stick relay 2WS is closed from (+), through a circuit including front contact 55 of relay 4WS, wire 56, front contact 57 of relay 2T, windings of relay 2WS, to (—). An auxiliary stick circuit for this directional relay 2WS is closed by its front contact 58 completing a shunt circuit around the front contact 57 of the track relay 2T.

A pick-up circuit for the directional stick relay 7WS is closed from (+), through a circuit including the time locking contact 14—16TL, back contact 71 of relay 16SLP, back contact 72 of relay 14SLP, front contact 73 of track relay 7T, windings of relay 7WS, to (—). An auxiliary stick circuit for this directional stick relay 7WS is closed by its front contact 74 completing a shunt circuit around the front contact 73 of the track relay 7T.

A pick-up circuit for the directional stick relay 5WS is closed from (+), through a circuit including front contact 68 of relay 7WS, front contact 69 of track relay 5T, windings of relay 5WS, to (—). An auxiliary stick circuit for this directional stick relay 5WS is closed by its front contact 70 completing a shunt circuit around the front contact 69 of the track relay 5T.

A pick-up circuit for the directional stick relay 3WS is closed from (+), through a circuit including front contact 59 of relay 5WS, wire 60, front contact 61 of relay 2WS, front contact 62 of relay 3T, windings of relay 3WS, to (—). An auxiliary stick circuit for this relay 3WS is closed by its front contact 63 completing a shunt circuit around the front contact 62 of the track relay 3T. A holding circuit for the relay 3WS is closed by the front contact 64 of relay 23WP and the polar contact 65 of relay 23WP in its right hand position completing a shunt circuit around front contact 61 of relay 2WS to render the relay 2WS ineffective to control the relay 3WS when the track switches 2TS and 3TS are in normal positions.

An energizing circuit for the lock relay 23LR is closed from (+), through a circuit including front contact 75 of relay 3WS, front contact 76 of relay 2WS, front contact 77 of relay 2T, front contact 78 of relay 3T, front contact 79 of relay 2ES, front contact 80 of relay 3ES, windings of relay 23LR, to (—).

An energizing circuit for the lock relay 45LR is closed from (+), through a circuit including front contact 81 of relay 5WS, front contact 82 of relay 4WS, front contact 83 of relay 4T, front contact 84 of relay 5T, front contact 85 of relay 4ES, front contact 86 of relay 5ES, windings of relay 45LR, to (—).

An energizing circuit for the lock relay 7LR is closed from (+), through a circuit including front contact 87 of relay 7WS, front contact 88 of relay 7T, front contact 89 of relay 7ES, windings of relay 7LR, to (—).

With the signal control levers in their at-stop positions, their corresponding signals display stop indications. As the signals have been illustrated as being of the light signal type, the red indicator lamp R of each signal is energized through a back contact of its corresponding relay HR, while the green indicator lamp G of each signal is deenergized (see Figs. 4A and 4B). For example, the red or stop lamp of the signal 11 is energized by a circuit from (+) through a circuit including back contact 90 of relay 11HR, indicator lamp R, to (—).

As the track switches are in correspondence with their respective control levers, their respective correspondence relays are normally energized (see Fig. 1). For example, the correspondence relay 23CR is energized by a circuit closed from (+), through a circuit including contact 91 of switch machine control lever 23SML in a normal position, polar contact 92 of relay 23WP in a right hand position, front contact 93 of relay 23WP, windings of relay 23CR, to (—).

The correspondence relay 45CR is energized by a circuit closed from (+), through a circuit including contact 94 of switch machine control lever 45SML in a normal position, polar contact 95 of relay 45WP in a right hand position, front contact 96 of relay 45WP, windings of relay 45CR, to (—).

An energizing circuit for the correspondence relay 7CR is closed from (+), through a circuit including contact 97 of switch machine control lever 7SML in a normal position, polar contact 98 of relay 7WP in a right hand position, front contact 99 of relay 7WP, windings of relay 7CR, to (—).

*Establishing a route.*—With the system in the normal conditions above outlined, the operator may govern the track switches to such new positions as he may desire (see Fig. 1). For example, the operation of the switch machine lever 23SML to a reverse position causes the switch machines 2SM and 3SM to operate their respective track switches 2TS and 3TS to reverse positions; and similarly, the operation of the switch machine lever 45SML causes the switch machines 4SM and 5SM to operate their respective track switches to reverse positions. The operation of the switch machine lever 7SML to a reverse position causes the switch machine 7SM to operate the track switch 7TS to a reverse position. In other words, the track switches may be operated to such positions as desired to set up the particular route over which it is desired to have a train pass.

However, the track switches are responsive to their respective control levers only when their respective lock relays LR are energized. For example, if the lock relay 23LR is deenergized with front contact 101 open (see Figs. 1 and 3A), the operation of the switch machines 2SM and 3SM is prevented. Similarly, if the lock relay 45LR is deenergized with front contact 102 open, the operation of the switch machines 4SM and 5SM is prevented in response to the lever 45SML. Likewise, the deenergization of the lock relay 7LR with front contact 103 open, the operation of the switch machine 7SM is prevented in response to the switch machine lever 7SML.

With a particular mechanical set-up of the track switches, two routes may be set up thereover. In other words, a route is considered as involving the direction in which a train is allowed to pass over the trackway. With the particular track layout and signaling arrangement chosen for the embodiment of the invention, sixteen different routes may be established, as tabulated below. In this table, the direction of the route is to be considered from the signal first named to the signal last named.

*Route table*

1. Signal 13 to signal 12
2. Signal 13 to signal 14
3. Signal 13 to signal 16
4. Signal 11 to signal 12
5. Signal 11 to signal 14
6. Signal 11 to signal 16
7. Signal 12 to signal 13
8. Signal 12 to signal 11
9. Signal 14 to signal 13
10. Signal 14 to signal 11
11. Signal 16 to signal 13
12. Signal 16 to signal 11
13. Signal 11 over both cross-overs to signal 14
14. Signal 11 over both cross-overs to signal 16
15. Signal 14 over both cross-overs to signal 11
16. Signal 16 over both cross-overs to signal 11

Although a large number of routes can be set up over the track layout chosen for the embodiment of the present invention, it is considered sufficient for an understanding of the present invention to explain in detail only the establishment of a single route and the manner in which another route may be preconditioned while the first route is still established.

For example, let us assume that the operator desires to set up a route for the passage of a train in an east bound direction from the signal 13 to the signal 16. To do this, the operator first positions the switch machine lever 23SML in a normal position and the switch machine levers 45SML and 7SML in reverse positions. Upon such positioning of the switch machine control levers with the system in normal condition above explained, the switch machines immediately respond and operate their respective track switches to corresponding locked positions.

The correspondence relays CR are deenergized as soon as their control levers are operated out of correspondence with their track switches and are maintained deenergized during the operation of the switches, irrespective of the switch machine control lever movement by reason of the unlocked condition of the track switches causing the deenergized condition of their respective switch position repeating relays WP. In other words, during the operation of a track switch, its switch position repeating relay WP is deenergized and the neutral contacts of said relay assume deenergized positions, but when the track switch reaches its new position, it energizes the relay WP with the opposite polarity which actuates its polar contacts to their opposite positions and its neutral contacts to energized picked up positions. Then, as correspondence is established between the switch machine control levers SML and their respective track switches, their correspondence relays CR are again energized.

In the particular case assumed, the track switches 4TS and 5TS are reversed so that as soon as they are in reverse locked positions in correspondence with their control lever SML, a reverse energizing circuit is completed for the correspondence relay 45CR from (+), through a circuit including contact 94 of lever 45SML in a reverse position, polar contact 95 of relay 45WP in a left hand position, front contact 96 of relay 45WP, windings of relay 45CR, to (—).

Similarly, the reverse operation of the track switch 7TS into correspondence with the switch machine control lever 7SML completes a reverse energizing circuit for the correspondence relay 7CR from (+), through a circuit including contact 97 of lever 7SML in a reverse position, polar contact 98 of relay 7WP in a left hand position, front contact 99 of relay 7WP, windings of relay 7CR, to (—).

Although we have considered the complete response of the track switches to their control levers prior to considering the operation of a signal lever, the signal lever 13SL may be operated to a proceed or clearing position immediately following the operation of the switch machine control levers involved in the desired route (see Fig. 2). This can be done as the correspondence relays associated with the switch machine levers which are operated are immediately deenergized, so that the subsequent operation of the signal lever 13SL to a proceed position can not then clear its signal by reason of the open condition of the preliminary route selecting circuit. This will be more readily apparent following the pointing out of the detailed circuit.

For the particular route chosen, the track switches 2TS and 3TS are in normal positions while the track switches 4TS, 5TS and 7TS are in reverse positions. With this mechanical route set up, a preliminary route selecting circuit is completed which has circuit portions corresponding to the mechanical portions of the track layout. This preliminary route selecting circuit, together with the route selecting circuit later to be explained, is set up by means of the positions of the track switches repeated by their respective relays 23WP, 45WP and 7WP.

Assuming that the switches have responded and that the signal lever 13SL is in a proceed position, a preliminary route selecting circuit is closed for the signal lever repeating relay 13SLP from (+), through a circuit including lever 13SL in a proceed position, windings of relay 13SLP, back contact 110 of relay 13RR, polar contact 111 of relay 23WP in a right hand position, front contact 112 of relay 23WP, front contact 113 of correspondence relay 23CR, front contact 114 of correspondence relay 45CR, front contact 115 of relay 45WP, polar contact 116 of relay 45WP in a left hand position, polar contact 117 of relay 45WP in a left hand position, front contact 118 of relay 45WP, front contact 119 of relay 45CR, front contact 120 of relay 7CR, front contact 121 of relay 7WP, polar contact 122 of relay 7WP in a left hand position, back contact 123 of relay 16RR, contact 124 of lever 16SL in an "at-stop" position, to (—).

As soon as this preliminary route selecting circuit is set up, a stick circuit is closed for the relay 13SLP from (+), through a circuit including lever 13SL in a proceed position, windings of relay 13SLP, front contact 126 of relay 13SLP, to (—). With this stick circuit closed, the energization of the relay 13SLP is independent of the continued establishment of the preliminary route selecting circuit.

Before considering the results of the picking up of the signal lever repeating relay 13SLP, it is expedient to first consider the conditions of the directional stick relays. With the relay 45WP in reverse position in correspondence with the existing reverse positions of the track switches 4TS and 5TS, the contact 36 of the relay 4ES is unshunted by contacts 38 and 39. Also, the operation of the track switches 4TS and 5TS to reverse positions as repeated by relay 45WP closes a shunt holding circuit for the relay 3WS by shunting contact 59 of relay 5WS from (+), through polar contact 67 of relay 45WP in a reverse position, front contact 66 to the wire 60. This maintains the relay 3WS energized independent of contact 59 of relay 5WS.

With these conditions established with respect to the directional stick relays, the picking up of a signal lever repeating relay causes those directional stick relays, associated with the route mechanically set up, to be deenergized successively (see Figs. 3A and 3B). This, in turn, causes the lock relays to be deenergized which locks all of the track switches in the route (see Fig. 1).

In the case of the picking up of the contacts of the relay 13SLP, the pick-up and stick circuits for the directional stick relay 2ES are opened at back contact 26 and its contacts are released. The opening of front contact 31 of relay 2ES deenergizes the pick-up and stick circuits of the relay 4ES and its contacts are released. The opening of front contact 36 of relay 4ES opens the pick-up and stick circuits of the relay 5ES and its contacts are released. The opening of front contact 42 of relay 5ES deenergizes the pick-up and stick circuits of the relay 7ES and its contacts are released.

The opening of front contact 79 of relay 2ES causes the lock relay 23LR to be deenergized, thereby locking the track switches 2TS and 3TS from operation in response to the control lever 23SML. Similarly, the opening of front contacts 85 and 86 of relay 4ES and 5ES deenergizes the lock relay 45LR, which locks the track switches 4TS and 5TS from operation in response to the control lever 45SML. Also, the opening of front contact 89 of relay 7ES deenergizes the lock relay 7LR, which prevents the response of the track switch 7TS to the control lever 7SML.

Now that the track switches are locked, as indicated in the route circuits by back contacts on the lock relays, the route circuit for energizing the route relay 13RR in series with the route relay 16RR is closed (see Fig. 2). In other words, the energization of the relay 13SLP over the preliminary route selecting circuit prepares at its front contact 130 (see Fig. 2) the energization of the final route selecting circuit, and at the same time its back contact 26 (see Fig. 3A) initiates the locking of the track switches in the route which must be accomplished before the final route selecting circuit can be closed.

More specifically, this final route selecting circuit (see Fig. 2) is closed from (+), through a circuit including front contact 130 of relay 13SLP, windings of relay 13RR, polar contact 131 of relay 23WP in a right hand position, front contact 132 of relay 23WP, back contact 133 of relay 23LR, back contact 134 of relay 45LR, front contact 135 of 45WP, polar contact 136 of relay 45WP in a left hand position, polar contact 137 of relay 45WP in a left hand position, front contact 138 of relay 45WP, back contact 139 of relay 45LR, back contact 140 of relay 7LR, front contact 141 of relay 7WP, polar contact 142 of relay 7WP in a left hand position, windings of relay 16RR, back contact 143 of relay 16SLP, to (—).

The energization of the route relay 13RR opens the preliminary route selecting circuit at back contact 110 so that the relay 13SLP is entirely dependent for its energization upon its stick circuit closed through its front contact 126 and lever 13SL in a proceed position. Also, the energization of the route relay 16RR opens back contact 123 which prevents the energization of the relay 16SLP by the lever 16SL moved to a proceed position.

Contemporaneous energization of the relays 13SLP and 13RR closes an energizing circuit for the relay 13HR (see Fig. 4A) from (+), through a circuit including front contact 150 of relay 7T, polar contact 151 of relay 45WP in a left hand position, front contact 152 of relay 45WP, front contact 153 of track relay 4T, front contact 154 of relay 23WP, polar contact 155 of relay 23WP in a right hand position, front contact 156 of relay 2T, front contact 157 of relay 13RR, front contact 158 of relay 13SLP, windings of relay 13HR, front contact 159 of relay 13SLP, to (—).

The closure of front contact 160 of relay 13HR denergizes the red lamp R of the signal 13 and energizes the green lamp G. Thus, the route desired to be set up by the operator is established and the train may proceed in acceptance thereof over the trackway.

As soon as the train enters the route by occupying the track section 2, the track relay 2T is denergized which opens the pick-up circuit of the relay 2ES at front contact 27, so that irrespective of the signal lever 13SL, the route will be maintained established in advance of the train. In other words, the entrance of the train into the route holds all of the directional stick relays denergized in advance, although the controlling signal lever may be moved to a stop position and the signal lever repeating relay SLP be denergized. Then, upon the passage of the train over each succeeding track section, when the signal control lever 13SL has been returned to its stop position, the directional stick relays in the rear are successively energized.

More specifically, let us assume that the train enters the detector track section 2 in acceptance of the signal 13 and that subsequent thereto the operator moves the signal lever 13SL to a stop position. With the lever 13SL in a stop position, both the pick-up and stick circuits of the relay 13SLP are opened and its contacts are released. The opening of front contact 130 denergizes the route circuit including relay 13RR, while the denergization of the relay 13SLP and 13RR both open the energizing circuit for the relay 13HR causing the signal 13 to again display a stop indication by energizing its lamp R.

It should be noted, however, that the signal 13 is put to stop immediately upon the entrance of the train into the track section 2 by reason of the opening of front contact 156 of the track relay 2T even if the lever 13SL is not returned. The closure of back contact 26 of relay 13SLP does not allow the relay 2ES to pick up until the train has moved onto the track section 4 for deenergizing the track relay 4T which prevents the energization of the relay 4ES although the relay 2ES picks up by reason of the closure of its pick-up circuit upon the departure of the train from section 2 resulting in closing front contact 27.

Similarly, the passage of the train into the track section 5 denergizes the track relay 5T which prevents the relay 5ES from picking up although the relay 4ES is energized upon the departure of the train from the track section 4 allowing the energization of the track relay 4T and the resulting closure of front contact 33.

Likewise, the entrance of the train into the track section 7 deenergizes the track relay 7T and prevents the relay 7ES from being energized even though the relay 5ES is picked up upon the departure of the train from the track section 5 by reason of the energization of the track 5T and the resulting closure of its front contact 37.

The departure of the train from the track section 7 on the turnout track allows the relay 7ES to pick up by closure of contact 43.

In brief, then, the passage of the train through the route with the signal lever put to stop as soon as the route is accepted, allows the directional stick relays for that route to be picked up sequentially in the rear of the train. This sequential energization of the direction stick relays allows the sequential energization of the lock relays LR upon the passage of the train beyond the track section governing such switches associated with the LR relays. The passage of the train out of the route restores the system to its normal at rest condition as illustrated.

*Various other circuits.*—The above description points out in detail the manner in which route No. 3 (referring to the "Route table") is established over the trackway and is cleared to allow the passage of a train together with the various detailed operations involved. The setting up of the remaining routes with their detailed operations may be readily understood by analogy to the description above given. However, it is thought expedient to point out in detail the preliminary route selecting circuits and the final route selecting circuits associated with each of the sixteen routes pointed out in the "Route table" together with certain other circuits which will be set up under certain combinations of circumstances in practice, before considering the preconditioning of a route. These circuits will be pointed out without any effort in explaining all of the circumstances and operations involved when they exist.

The preliminary route selecting circuit for route No. 1 (see "Route table") is closed from (+), through a circuit including lever 13SL in a proceed position, windings of relay 13SLP, back contact 110 of relay 13RR, polar contact 111 of relay 23WP in a right hand position, front contact 112 of relay 23WP, front contact 113 of relay 23CR, front contact 114 of relay 45CR, front contact 115 of relay 45WP, polar contact 116 of relay 45WP in a right hand position, back contact 172 of relay 12RR, contact 173 of lever 12SL in a normal "at-stop" position, to (—).

The final route selecting circuit for route No. 1 (see "Route table") is closed from (+), through a circuit including front contact 130 of relay 13SLP, windings of relay 13RR, polar contact 131 of relay 23WP in a right hand position, front contact 132 of relay 23WP, back contact 133 of relay 23LR, back contact 134 of relay 45LR, front contact 135 of relay 45WP, polar contact 136 of relay 45WP in a right hand position, windings of relay 12RR, back contact 218 of relay 12SLP, to (—).

The preliminary route selecting circuit for route No. 2 (see "Route table") is closed from (+), through a circuit including lever 13SL in a proceed position, windings of relay 13SLP, back contact 110 of relay 13RR, polar contact 111 of relay 23WP in a right hand position, front contact 112 of relay 23WP, front contact 113 of relay 23CR, front contact 114 of relay 45CR, front contact 115 of relay 45WP, polar contact 116 of relay 45WP in a left hand position, polar contact 117 of relay 45 WP in a left-hand position, front contact 118 of relay 45WP, front contact 119 of relay 45CR, front contact 120 of relay 7CR, front contact 121 of relay 7WP, polar contact 122 of relay 7WP in a right hand position, back contact 165 of relay 14RR, contact 166 of lever 14SL in a normal "at-stop" position, to (—).

The final route selecting circuit for route No. 2 (see "Route table") is closed from (+), through a circuit including front contact 130 of relay 13SLP, windings of relay 13RR, polar contact 131 of relay 23WP in a right hand position, front contact 132 of relay 23WP, back contact 133 of relay 23LR, back contact 134 of relay 45LR, front contact 135 of relay 45WP, polar contact 136 of relay 45WP in a left hand position, polar contact 137 of relay 45WP in a left hand position, front contact 138 of relay 45WP, back contact 139 of relay 45LR, back contact 140 of relay 7LR, front contact 141 of relay 7WP, polar contact 142 of relay 7WP in a right hand position, windings of relay 14RR, back contact 171 of relay 14SLP, to (—).

The preliminary route selecting circuit and the final route selecting circuit for route No. 3 (see "Route table") has been pointed out in detail under the heading "Establishing a route" and need not again be explained.

The preliminary route selecting circuit for route No. 4 (see "Route table") is closed from (+), through a circuit including lever 11SL in a proceed position, windings of relay 11SLP, back contact 161 of relay 11RR, front contact 162 of relay 23CR, front contact 163 of relay 23WP, polar contact 164 of relay 23WP in a left hand position, polar contact 111 of relay 23WP in a left hand position, front contact 112 of relay 23WP, front contact 113 of relay 23CR, front contact 114 of relay 45CR, front contact 115 of relay 45WP, polar contact 116 of relay 45WP in a right hand position, back contact 172 of relay 12RR, contact 173 of lever 12SL in an "at-stop" position, to (—).

The final route selecting circuit for route No. 4 (see "Route table") is closed from (+), through a circuit including front contact 167 of relay 11SLP, windings of relay 11RR, back contact 168 of relay 23LR, front contact 169 of relay 23WP, polar contact 170 of relay 23WP in a left hand position, polar contact 131 of relay 23WP in a left hand position, front contact 132 of relay 23WP, back contact 133 of relay 23LR, back contact 134 of relay 45LR, front contact 135 of relay 45WP, polar contact 136 of relay 45WP in a right hand position, windings of relay 12RR, back contact 218 of relay 12SLP, to (—).

The preliminary route selecting circuit for route No. 5 (see "Route table") is closed from (+), through a circuit including lever 11SL in a proceed position, windings of relay 11SLP, back contact 161 of relay 11RR, front contact 162 of relay 23CR, front contact 163 of relay 23WP, polar contact 164 of relay 23WP in a right hand position, polar contact 117 of relay 45WP in a right hand position, front contact 118 of relay 45WP, front contact 119 of relay 45CR, front contact 120 of relay 7CR, front contact 121 of relay 7WP, polar contact 122 of relay 7WP in a right hand position, back contact 165 of relay 14RR, contact 166 of lever 14SL in an "at-stop" position, to (—).

The final route selecting circuit for route No. 5 (see "Route table") is closed from (+), through a circuit including front contact 167 of relay 11SLP, windings of relay 11RR, back contact 168 of relay 23LR, front contact 169 of relay 23WP, polar contact 170 of relay 23WP in a right hand position, polar contact 137 of relay 45WP in a right hand position, front contact 138 of relay 45WP, back contact 139 of relay 45LR, back contact 140 of relay 7LR, front contact 141 of relay 7WP, polar contact 142 of relay 7WP in a right hand position, windings of relay 14RR, back contact 171 of relay 14SLP, to (—).

The preliminary route selecting circuit for route No. 6 (see "Route table") is closed from (+), through a circuit including lever 11SL in a proceed position, windings of relay 11SLP, back contact 161 of relay 11RR, front contact 162 of relay 23CR, front contact 163 of relay 23WP, polar contact 164 of relay 23WP in a right hand position, polar contact 117 of relay 45WP in a right hand position, front contact 118 of relay 45WP, front contact 119 of relay 45CR, front contact 120 of relay 7CR, front contact 121 of relay 7WP, polar contact 122 of relay 7WP in a left hand position, back contact 123 of relay 16RR, contact 124 of lever 16SL in an "at-stop" position, to (—).

The final route selecting circuit for route No. 6 (see "Route table") is closed from (+), through a circuit including front contact 167 of relay 11SLP, windings of relay 11RR, back contact 168 of relay 23LR, front contact 169 of relay 23WP, polar contact 170 of relay 23WP in a right hand position, polar contact 137 of relay 45WP in a right hand position, front contact 138 of relay 45WP, back contact 139 of relay 45LR, back contact 140 of relay 7LR, front contact 141 of relay 7WP, polar contact 142 of relay 7WP in a left hand position, windings of relay 16RR, back contact 143 of relay 16SLP, to (—).

The preliminary route selecting circuit for route No. 7 (see "Route table") is closed from (+), through a circuit including lever 12SL in a proceed position, windings of relay 12SLP, back contact 172 of relay 12RR, polar contact 116 of relay 45WP in a right hand position, front contact 115 of relay 45WP, front contact 114 of relay 45CR, front contact 113 of relay 23CR, front contact 112 of relay 23WP, polar contact 111 of relay 23WP in a right hand position, back contact 110 of relay 13RR, contact 174 of lever 13SL in a normal "at-stop" position, to (—).

The final route selecting circuit for route No. 7 (see "Route table") is closed from (+), through a circuit including front contact 218 of relay 12SLP, windings of relay 12RR, polar contact 136 of relay 45WP in a right hand position, front contact 135 of relay 45WP, back contact 134 of relay 45LR, back contact 133 of relay 23LR, front contact 132 of relay 23WP, polar contact 131 of relay 23WP in a right hand position, windings of relay 13RR, back contact 130 of relay 13SLP, to (—).

The preliminary route selecting circuit for route No. 8 (see "Route table") is closed from (+), through a circuit including lever 12SL in a proceed position, windings of relay 12SLP, back contact 172 of relay 12RR, polar contact 116 of relay 45WP in a right hand position, front contact 115 of relay 45WP, front contact 114 of relay 45CR, front contact 113 of relay 23CR, front contact 112 of relay 23WP, polar contact 111 of relay 23WP in a left hand position, polar contact 164 of relay 23WP in a left hand position, front contact 163 of relay 23WP, front contact 162 of relay 23CR, back contact 161 of relay 11RR, contact 175 of lever 11SL in an "at-stop" position, to (—).

The final route selecting circuit for route No. 8 (see "Route table") is closed from (+), through a circuit including front contact 218 of relay 12SLP, windings of relay 12RR, polar contact 136 of relay 45WP in a right hand position, front contact 135 of relay 45WP, back contact 134 of relay 45LR, back contact 133 of relay 23LR, front contact 132 of relay 23WP, polar contact 131 of relay 23WP in a left hand position, polar contact 170 of relay 23WP in a left hand position, front contact 169 of relay 23WP, back contact 168 of relay 23LR, windings of relay 11RR, back contact 167 of relay 11SLP, to (—).

The preliminary route selecting circuit for route No. 9 (see "Route table") is closed from (+), through a circuit including lever 14SL in a proceed position, windings of relay 14SLP, back contact 165 of relay 14RR, polar contact 122 of relay 7WP in a right hand position, front contact 121 of relay 7WP, front contact 120 of relay 7CR, front contact 119 of relay 45CR, front contact 118 of relay 45WP, polar contact 117 of relay 45WP in a left hand position, polar contact 116 of relay 45WP in a left hand position, front contact 115 of relay 45WP, front contact 114 of relay 45CR, front contact 113 of relay 23CR, front contact 112 of relay 23WP, polar contact 111 of relay 23WP in a right hand position, back contact 110 of relay 13RR, contact 174 of lever 13SL in a normal "at-stop" position, to (—).

The final route selecting circuit for route No. 9 (see "Route table") is closed from (+), through a circuit including front contact 171 of relay 14SLP, windings of relay 14RR, polar contact 142 of relay 7WP in a right hand position, back contact 141 of relay 7WP, back contact 140 of relay 7LR, back contact 139 of relay 45LR, front contact 138 of relay 45WP, polar contact 137 of relay 45WP in a left hand position, polar contact 136 of relay 45WP in a left hand position, front contact 135 of relay 45WP, back contact 134 of relay 45LR, back contact 133 of relay 23LR, front contact 132 of relay 23WP, polar contact 131 of relay 23WP in a right hand position, windings of relay 13RR, back contact 130 of relay 13SLP, to (—).

The preliminary route selecting circuit for route No. 10 (see "Route table") is closed from (+), through a circuit including lever 14SL in a proceed position, windings of relay 14SLP, back contact 165 of relay 14RR, polar contact 122 of relay 7WP in a right hand position, front contact 121 of relay 7WP, front contact 120 of relay 7CR, front contact 119 of relay 45CR, front contact 118 of relay 45WP, polar contact 117 of relay 45WP in a right hand position, polar contact 164 of relay 23WP in a right hand position, front contact 163 of relay 23WP, front contact 162 of relay 23CR, back contact 161 of relay 11RR, contact 175 of lever 11SL in an "at-stop" position, to (—).

The final route selecting circuit for route No. 10 (see "Route table") is closed from (+), through a circuit including front contact 171 of relay 14SLP, windings of relay 14RR, polar contact 142 of relay 7WP in a right hand position, front contact 141 of relay 7WP, back contact 140 of relay 7LR, back contact 139 of relay 45LR, front contact 138 of relay 45WP, polar contact 137 of relay 45WP in a right hand position, polar contact 170 of relay 23WP in a right hand position, front contact 169 of relay 23WP, back contact 168 of relay 23LR, windings of relay 11RR, back contact 167 of relay 11SLP, to (—).

The preliminary route selecting circuit for route No. 11 (see "Route table") is closed from (+), through a circuit including lever 16SL in a proceed position, windings of relay 16SLP, back contact 123 of relay 16RR, polar contact 122 of relay 7WP in a left hand position, front contact 121 of relay 7WP, front contact 120 of relay 7CR, front contact 119 of relay 45CR, front contact 118 of relay 45WP, polar contact 117 of relay 45WP in a left hand position, polar contact 116 of relay 45WP in a left hand position, front contact 115 of relay 45WP, front contact 114 of relay 45CR, front contact 113 of relay 23CR, front contact 112 of relay 23WP, polar contact 111 of relay 23WP, back contact 110 of relay 13RR, contact 174 of lever 13SL in an "at-stop" position, to (—).

The final route selecting circuit for route No. 11 (see "Route table") is closed from (+), through a circuit including front contact 143 of relay 16SLP, windings of relay 16RR, polar contact 142 of relay 7WP in a left hand position, front contact 141 of relay 7WP, back contact 140 of relay 7LR, back contact 139 of relay 45LR, front contact 138 of relay 45WP, polar contact 137 of relay 45WP in a left hand position, polar contact 136 of relay 45WP in a left hand position, front contact 135 of relay 45WP, back contact 134 of relay 45LR, back contact 133 of relay 23LR, front contact 132 of relay 23WP, polar contact 131 of relay 23WP in a right hand position, windings of relay 13RR, back contact 130 of relay 13SLP, to (—).

The preliminary route selecting circuit for route No. 12 (see "Route table") is closed from (+), through a circuit including lever 16SL in a proceed position, windings of relay 16SLP, back contact 123 of relay 16RR, polar contact 122 of relay 7WP in a left hand position, front contact 121 of relay 7WP, front contact 120 of relay 7CR, front contact 119 of relay 45CR, front contact 118 of relay 45WP, polar contact 117 of relay 45WP in a right hand position, polar contact 164 of relay 23WP in a right hand position, front contact 163 of relay 23WP, front contact 162 of relay 23CR, back contact 161 of relay 11RR, contact 175 of lever 11SL in an "at-stop" position, to (—).

The final route selecting circuit for route No. 12 (see "Route table") is closed from (+), through a circuit including front contact 143 of relay 16SLP, windings of relay 16RR, polar contact 142 of relay 7WP in a left hand position, front contact 141 of relay 7WP, back contact 140 of relay 7LR, back contact 139 of relay 45LR, front contact 138 of relay 45WP, polar contact 137 of relay 45WP, in a right hand position, polar contact 170 of relay 23WP in a right hand position, front contact 169 of relay 23WP, back contact 168 of relay 23LR, windings of relay 11RR, back contact 167 of relay 11SLP, to (—).

The preliminary route selecting circuit for route No. 13 (see "Route table") is closed from (+), through a circuit including lever 11SL in a proceed position, windings of relay 11SLP, back contact 161 of relay 11RR, front contact 162 of relay 23CR, front contact 163 of relay 23WP, polar contact 164 of relay 23WP in a left hand position, polar contact 111 of relay 23WP in a left hand position, front contact 112 of relay 23WP, front contact 113 of relay 23CR, front contact 114 of relay 45CR, front contact 115 of relay 45WP, polar contact 116 of relay 45WP in a left hand position, polar contact 117 of relay 45WP in a left hand position, front contact 118 of relay 45WP, front contact 119 of relay 45CR, front contact 120 of relay 7CR, front contact 121 of relay 7WP, polar contact 122 of relay 7WP in a right hand position, back contact 165 of relay 14RR, contact 166 of lever 14SL in an "at-stop" position, to (—).

The final route selecting circuit for route No. 13 (see "Route table") is closed from (+), through a circuit including front contact 167 of relay 11SLP, windings of relay 11RR, back contact 168 of relay 23LR, front contact 169 of relay 23WP, polar contact 170 of relay 23WP in a left hand position, polar contact 131 of relay 23WP in a left hand position, front contact 132 of relay 23WP, back contact 133 of relay 23LR, back contact 134 of relay 45LR, front contact 135 of relay 45WP, polar contact 136 of relay 45WP in a left hand position, polar contact 137 of relay 45WP in a left hand position, front contact 138 of relay 45WP, back contact 139 of relay 45LR, back contact 140 of relay 7LR, front contact 141 of relay 7WP, polar contact 142 of relay 7WP in a right hand position, windings of relay 14RR, back contact 171 of relay 14SLP, to (—).

The preliminary route selecting circuit for route No. 14 (see "Route table") is closed from (+), through a circuit including lever 11SL in a proceed position, windings of relay 11SLP, back contact 161 of relay 11RR, front contact 162 of relay 23CR, front contact 163 of relay 23WP, polar contact 164 of relay 23WP in a left hand position, polar contact 111 of relay 23WP in a left hand position, front contact 112 of relay 23WP, front contact 113 of relay 23CR, front contact 114 of relay 45 CR, front contact 115 of relay 45WP, polar contact 116 of relay 45WP in a left hand position, polar contact 117 of relay 45WP in a left hand position, front contact 118 of relay 45WP, front contact 119 of relay 45CR, front contact 120 of relay 7CR, front contact 121 of relay 7WP, polar contact 122 of relay 7WP in a left hand position, back contact 123 of relay 16RR, contact 124 of lever 16SL in an "at-stop" position, to (—).

The final route selecting circuit for route No. 14 (see "Route table") is closed from (+), through a circuit including front contact 167 of relay 11SLP, windings of relay 11RR, back contack 168 of relay 23LR, front contact 169 of relay 23WP, polar contact 170 of relay 23WP in a left hand position, polar contact 131 of relay 23WP in a left hand position, front contact 132 of relay 23WP, back contact 133 of relay 23LR, back contact 134 of relay 45LR, front contact 135 of relay 45WP, polar contact 136 of relay 45WP in a left hand position, polar contact 137 of relay 45WP in a left hand position, front contact 138 of relay 45WP, back contact 139 of relay 45LR, back contact 140 of relay 7LR, front contact 141 of relay 7WP, polar contact 142 of relay 7WP in a left hand position, windings of relay 16RR, back contact 143 of relay 16SLP, to (—).

The preliminary route selecting circuit for route No. 15 (see "Route table") is closed from (+), through a circuit including lever 14SL in a proceed position, windings of relay 14SLP, back contact 165 of relay 14RR, polar contact 122 of relay 7WP in a right hand position, front contact 121 of relay 7WP, front contact 120 of relay 7CR, front contact 119 of relay 45CR, front contact 118 of relay 45WP, polar contact 117 of relay 45WP in a left hand position, polar contact 116 of relay 45WP in a left hand position, front contact 115 of relay 45WP, front contact 114 of relay 45CR, front contact 113 of relay 23CR, front contact 112 of relay 23WP, polar contact 111 of relay 23WP in a left hand position, polar contact 164 of relay 23WP in a left hand position, front contact 163 of relay 23WP, front contact 162 of relay 23CR, back contact 161 of relay 11RR, contact 175 of lever 11SL in an "at-stop" position, to (—).

The final route selecting circuit for route No. 15 (see "Route table") is closed from (+), through a circuit including front contact 171 of relay 14SLP, windings of relay 14RR, polar contact 142 of relay 7WP in a right hand position, front contact 141 of relay 7WP, back contact 140 of relay 7LR, back contact 139 of relay 45LR, front contact 138 of relay 45WP, polar contact 137 of relay 45WP in a left hand position, polar contact 136 of relay 45WP in a left hand position, front contact 135 of relay 45WP, back contact 134 of relay 45LR, back contact 133 of relay 23LR, front contact 132 of relay 23WP, polar contact 131 of relay 23WP in a left hand position, polar contact 170 of relay 23WP in a left hand position, front contact 169 of relay 23WP, back contact 168 of relay 23LR, windings of relay 11RR, back contact 167 of relay 11SLP, to (—).

The preliminary route selecting circuit for route No. 16 (see "Route table") is closed from (+), through a circuit including lever 16SL in a proceed position, windings of relay 16SLP, back contact 123 of relay 16RR, polar contact 122 of relay 7WP in a left hand position, front contact 121 of relay 7WP, front contact 120 of relay 7CR, front contact 119 of relay 45CR, front contact 118 of relay 45WP, polar contact 117 of relay 45WP in a left hand position, polar contact 116 of relay 45WP in a left hand position, front contact 115 of relay 45WP, front contact 114 of relay 45CR, front contact 113 of relay 23CR, front contact 112 of relay 23WP, polar contact 111 of relay 23WP in a left hand position, polar contact 164 of relay 23WP in a left hand position, front contact 163 of relay 23WP, front contact 162 of relay 23CR, back contact 161 of relay 11RR, contact 175 of lever 11SL in an "at-stop" position, to (—).

The final route selecting circuit for route No. 16 (see "Route table") is closed from (+), through a circuit including front contact 143 of relay 16SLP, windings of relay 16RR, polar contact 142 of relay 7WP in a left hand position, front contact 141 of relay 7WP, back contact 140 of relay 7LR, back contact 139 of relay 45LR, front contact 138 of relay 45WP, polar contact 137 of relay 45WP in a left hand position, polar contact 136 of relay 45WP in a left hand position, front contact 135 of relay 45WP, back contact 134 of relay 45LR, back contact 133 of relay 23LR, front contact 132 of relay 23WP, polar contact 131 of relay 23WP in a left hand position, polar contact 170 of relay 23WP in a left hand position, front contact 169 of relay 23WP, back contact 168 of relay 23LR, windings of relay 11RR, back contact 167 of relay 11SLP, to (—).

As previously pointed out, the lever repeating relay 13SLP has a stick circuit closed once its contacts are picked up by reason of its energization over a preliminary route selecting circuit, so long as the lever 13SL is maintained in a proceed position to close the stick circuit through front contact 126. A similar stick circuit is closed for each of the remaining signal lever repeating relays SLP, as each of these relays have suitable stick contacts.

More specifically, the relay 11SLP has a stick contact 176 for closing its stick circuit with the lever 11SL in a proceed position whenever this relay 11SLP has been picked up over a preliminary route selecting circuit.

The relay 12SLP has a stick contact 177 for closing its stick circuit with the lever 12SL in a proceed position whenever this relay 12SLP has been picked up over a preliminary route selecting circuit.

The relay 14SLP has a stick contact 178 for closing its stick circuit with the lever 14SL in a proceed position whenever this relay 14SLP has been picked up over a preliminary route selecting circuit.

The relay 16SLP has a stick contact 179 for closing its stick circuit with the lever 16SL in a proceed position whenever this relay 16SLP has been picked up over a preliminary route selecting circuit.

The energizing circuit for the signal controlling relay 13HR for route No. 1 is closed from (+), through a circuit including polar contact 151 of relay 45WP in a right hand position, front contact 152 of relay 45WP, front contact 153 of relay 4T, front contact 154 of relay 23WP, polar contact 155 of relay 23WP in a right hand position, front contact 156 of relay 2T, front contact 157 of relay 13RR, front contact 158 of relay 13SLP, windings of relay 13HR, front contact 159 of relay 13SLP, to (—).

The energizing circuit for the signal controlling relay 13HR for route No. 2 is the same as explained for route No. 3 in the above description under the heading "Establishing a route."

The energizing circuit for the signal controlling relay 11HR for route No. 4 is closed from (+), through a circuit including polar contact 151 of relay 45WP in a right hand position, front contact 152 of relay 45WP, front contact 153 of relay 4T, front contact 154 of relay 23WP, polar contact 155 of relay 23WP in a left hand position, polar contact 185 of relay 23WP in a left hand position, front contact 184 of relay 23WP, front contact 186 of relay 3T, front contact 187 of relay 11RR, front contact 188 of relay 11SLP, windings of relay 11HR, front contact 189 of relay 11SLP, to (—).

The energizing circuit for the signal controlling relay 11HR for route No. 5 is closed from (+), through a circuit including front contact 180 of relay 7T, front contact 181 of relay 45WP, polar contact 182 of relay 45WP in a right hand position, front contact 183 of relay 5T, polar contact 185 of relay 23WP in a right hand position, front contact 184 of relay 23WP, front contact 186 of relay 3T, front contact 187 of relay 11RR, front contact 188 of relay 11SLP, windings of relay 11HR, front contact 189 of relay 11SLP, to (—).

The energizing circuit for the signal controlling relay 11HR for route No. 6 is the same as for route No. 5 as the track circuit in the rear of signal 16 is the same as in the rear of signal 14.

The energizing circuit for the signal controlling relay 12HR for route No. 7 is closed from (+), through a circuit including polar contact 191 of relay 23WP in a right hand position, front contact 192 of relay 23WP, front contact 193 of relay 2T, front contact 194 of relay 4T, wire 195, front contact 196 of relay 12RR, front contact 197 of relay 12SLP, windings of relay 12HR, front contact 198 of relay 12SLP, to (—).

The energizing circuit for the signal controlling relay 12HR for route No. 8 is closed from (+), through a circuit including front contact 190 of relay 3T, polar contact 191 of relay 23WP in a left hand position, front contact 192 of relay 23WP, front contact 193 of relay 2T, front contact 194 of relay 4T, wire 195, front contact 196 of relay 12RR, front contact 197 of relay 12SLP, windings of relay 12HR, front contact 198 of relay 12SLP, to (—).

The energizing circuit for the signal controlling relay 14HR for route No. 9 is closed from (+), through a circuit including polar contact 191 of relay 23WP in a right hand position, front contact 192 of relay 23WP, front contact 216 of relay 2T, front contact 217 of relay 4T, polar contact 201 of relay 45WP in a left hand position, front contact 202 of relay 45WP, front contact 203 of relay 5T, front contact 204 of relay 7T, wire 205, front contact 207 of relay 14RR, front contact 208 of relay 14SLP, windings of relay 14HR, front contact 209 of relay 14SLP, to (—).

The energizing circuit for the signal controlling relay 14HR for route No. 10 is closed from (+), through a circuit including front contact 200 of relay 3T, polar contact 201 of relay 45WP, in a right hand position, front contact 202 of relay 45WP, front contact 203 of relay 5T, front contact 204 of relay 7T, wire 205, front contact 207 of relay 14RR, front contact 208 of relay 14SLP, windings of relay 14HR, front contact 209 of relay 14SLP, to (—).

The energizing circuit for the signal controlling relay 16HR for route No. 11 is closed from (+), through a circuit including polar contact 191 of relay 23WP in a right hand position, front contact 192 of relay 23WP, front contact 216 of relay 2T, front contact 217 of relay 4T, polar contact 201 of relay 45WP in a left hand position, front contact 202 of relay 45WP, front contact 203 of relay 5T, front contact 204 of relay 7T, wires 205 and 215, front contact 211 of relay 16RR, front contact 212 of relay 16SLP, windings of relay 16HR, front contact 213 of relay 16SLP, to (—).

The energizing circuit for the signal controlling relay 16HR for route No. 12 is closed from (+), through a circuit including front contact 200 of relay 3T, polar contact 201 of relay 45WP, in a right hand position, front contact 202 of relay 45WP, front contact 203 of relay 5T, front contact 204 of relay 7T, wires 205 and 215, front contact 211 of relay 16RR, front contact 212 of relay 16SLP, windings of relay 16HR, front contact 213 of relay 16SLP, to (—).

The energizing circuit for the signal controlling relay 11HR for route No. 13 is closed from (+), through a circuit including front contact 150 of relay 7T, polar contact 151 of relay 45WP in a left hand position, front contact 152 of relay 45WP, front contact 153 of relay 4T, front contact 154 of relay 23WP, polar contact 155 of relay 23WP in a left hand position, polar contact 185 of relay 23WP in a left hand position, front contact 184 of relay 23WP, front contact 186 of relay 3T, front contact 187 of relay 11RR, front contact 188 of relay 11SLP, windings of relay 11HR, front contact 189 of relay 11SLP, to (—).

The energizing circuit for the signal controlling relay 11HR for route No. 14 is the same as for route No. 13.

The energizing circuit for the signal controlling relay 14HR for route No. 15 is closed from (+), through a circuit including front contact 190 of relay 3T, polar contact 191 of relay 23WP in a left hand position, front contact 192 of relay 23WP, front contact 216 of relay 2T, front contact 217 of relay 4T, polar contact 201 of relay 45WP in a left hand position, front contact 202 of relay 45WP, front contact 203 of relay 5T, front contact 204 of relay 7T, wire 205, front contact 207 of relay 14RR, front contact 208 of relay 14SLP, windings of relay 14HR, front contact 209 of relay 14SLP, to (—).

The energizing circuit for the signal controlling relay 16HR for route No. 16 is closed from (+), through a circuit including front contact 190 of relay 3T, polar contact 191 of relay 23WP in a left hand position, front contact 192 of relay 23WP, front contact 216 of relay 2T, front contact 217 of relay 4T, polar contact 201 of relay 45WP in a left hand position, front contact 202 of relay 45WP, front contact 203 of relay 5T, front contact 204 of relay 7T, wires 205 and 215, front contact 211 of relay 16RR, front contact 212 of relay 16SLP, windings of relay 16HR, front contact 213 of relay 16SLP, to (—).

It has been pointed out above that the red indicating lamp R of the signals 11, 12, 13, 14 and 16 are energized so as to give a danger or stop indication under normal conditions. This is accomplished by reason of the closure of their energizing circuits through back contacts of their corresponding signal controlling relays HR. The energization of the respective signal controlling relays HR deenergizes the respective indicating lamps R and energizes through front contacts the respective indicating lamps G.

More specifically, the relay 11HR controls the signal 11 by its contact 99; the relay 12HR controls the signal 12 by its contact 199; the relay 13HR controls the signal 13 by its contact 160; the relay 14HR controls the signal 14 by its contact 210; and the relay 16HR controls the signal 16 by its contact 214.

*Preconditioning of a route.*—In the description of the present invention, it is desired to employ the word "preconditioning" in connection with the positioning of the control levers for a route prior to the actual establishment of that route which is prevented from being established until a route with which it conflicts ceases to conflict. In other words, the operator may set up one route and immediately thereafter position the control levers for another route which conflicts with the first route, but the first route is not actually set up until the second route ceases to conflict with it. Thus, the second route may be said to be preconditioned during that time in which the first route still conflicts with it.

To describe such a situation, we may assume that the operator has established a first route (route No. 3 as previously described) by clearing signal 13 for the passage of a train in an eastbound direction over the track switch 2TS in a normal position, and the track switches 4TS, 5TS and 7TS in reverse positions. Under these conditions, the lever repeating relay 13SLP is energized together with the route relay 13RR so that the relay 13HR is energized clearing the signal 13. The lever repeating relay 13SLP is maintained energized independent of its preliminary route selecting circuit and is held energized dependent upon its stick circuit including the signal lever 13SL in a proceed position. Also, with the route relay 13RR energized and the directional stick relays for that route deenergized, the lock relays 23LR, 45LR and 7LR are deenergized, as previously explained.

With the lock relay 45LR deenergized, opening front contact 102 in the switch machine control circuit, the switch machine control lever 45SML can be put to a normal position without causing the operation of the track switches 4TS and 5TS. Thus, if the operator desires to clear the signal 11 to allow a second eastbound train to follow the first train by preconditioning Route No. 6, he positions the lever 45SML to a normal position and moves the signal lever 11SL to a proceed position.

The lever 45SML returned to a normal position deenergizes its correspondence relay 45CR. Although the signal lever 11SL is in a proceed position, the lever repeating relay 11SLP can not pick up as its preliminary route selecting circuit is not yet closed.

When the first train accepts the route No. 3 established upon the clearing of signal 13, the operator may return the signal lever 13SLP to a stop position. This allows the lock relays 23LR and 45LR to be picked up after the train passes the corresponding track sections associated with the corresponding switches. In other words, as soon as the train is on the track section 7 and is entirely off the track section 5, the switch machines 4SM and 5SM respond to the control lever 45SML in a normal position and operate the track switches 4TS and 5TS to normal positions. As soon as the track switches 4TS and 5TS are in normal positions, the switch repeating relay 45WP is operated into correspondence therewith and the correspondence relay 45CR is energized.

This completes the preliminary route selecting circuit for the lever repeating relay 11SLP for route No. 6 as pointed out above. This energization of relay 11SLP causes the tumble-down of the directional stick relays 3ES, 5ES and 7ES by the opening of back contact 46 of relay 11SLP. It is to be noted, however, that the relay 7ES may already be down as the first train which accepted the route No. 3 may not yet have passed off from the track section 7. However, the tumble-down directional stick relays are all deenergized for the route No. 6. Thus, the route relay 11RR may be energized in series with the route relay 16RR through the final route selecting circuit for route No. 6 as given above.

This energization of the relay 11RR together with the energization of the relay 11SLP closes the selecting circuit for the signal control relay 11HR for route No. 6 as pointed out in detail above. The energization of the relay 11HR closes front contact 99 and causes the signal 11 to be cleared by the energization of its green lamp G, so that the second train can proceed to follow over the route No. 6 thus established.

As the second train passes through this route No. 6, the track switches are sequentially released as will be understood by analogy to the description of the route No. 3 above described.

*A facing point route preconditioned.*—In the above explanation of preconditioning, the route preconditioned entered the first route through a trailing point move of the track switch 5TS, so that the preliminary route selecting circuit for route No. 6 as well as its final route selecting circuit was opened at polar contacts 117 and 137 of relay 45WP until the switches 4TS and 5TS were operated into correspondence with the lever 45SML in a normal position, which does not bring out the particular usefulness of the correspondence relay 45CR, for example.

Assuming only the route No. 1 to be set up, then if the operator should move the signal lever 11SL to a proceed position, without first operating the switch machine lever 23SML to a reverse position, the parallel route No. 5 would be set up allowing a train to pass on to the signal 14. For example, assuming the lever 23SML to still be in a normal position, it will be apparent that the preliminary route selecting circuit for route No. 5 may be closed for the relay 11SLP with the signal lever 11SL in a proceed position, as above pointed out.

However, in preconditioning the desired route No. 4 so as to have a second train follow the first train which is just passing over route No. 1, the operator moves the switch machine control lever 23SML to a reverse position prior to the operation of the signal control lever 11SL to a proceed position. This causes the de-energization of the correspondence relay 23CR which opens the preliminary route selecting circuits for routes No. 5 and No. 4 at its front contact 162, thereby preventing an undesired parallel route to be set up from signal 11 to signal 14 or 16.

The reversal of the track switches 2TS and 3TS upon the passage of the first train from track section 2 to track section 4 operates the relay 23WP to a reverse position followed by the energization of the relay 23CR. This completes the preliminary route selecting circuit for route No. 4 to energize the relay 11SLP.

The energization of the relay 11SLP causes the tumble-down of the directional stick relays for this route No. 4 as will be readily understood by analogy to the description already given. As soon as the lock relays have assumed de-energized positions in response to the tumble-down of the directional stick relays, the final route selecting circuit for route No. 4 is closed and energizes the relay 11RR. With the relays 11SLP and 11RR both picked up, the relay 11HR is energized over its selecting circuit for route No. 4, as above pointed out. This clears the signal 11 and the second train can proceed over the route No. 4 from signal 11 to signal 12 with the usual operations of the automatic signaling.

*System modified according to Fig. 5.*—The system of the present invention, as disclosed in preceding figures, may be modified in accordance with Fig. 5 to provide a system wherein the operator does not have to return the signal lever SL of a first route to a stop position in order to allow a preconditioned second route to automatically have its switches operated to proper positions followed by the clearing of its signal.

In accordance with the modification, the routes are established as previously described, but the acceptance of a route by a train puts its governing signal to stop, and is held "at-stop" by a stick repeating relay of the track section in the rear of that signal irrespective of whether its signal control lever is moved to stop or left in its proceed position. The stick repeating relay of this track section immediately in the rear of the signal permits the directional stick relays governing that route to be picked up in the rear of the train as the train passes through the route. Then, as soon as the route ceases to conflict with the preconditioned second route, the preconditioned route is then automatically set up. This feature has been illustrated more particularly in connection with signal 11 instead of illustrating it with the control circuits for all of the signals.

With reference to Fig. 5, a track repeating stick relay 3TPS is shown normally energized by a circuit closed from (+), through a circuit including back contact 253 of relay 11SLP, windings of relay 3TPS, front contact 254 of relay 3T, to (—). An auxiliary stick circuit for the relay 3TPS is closed from (+), through a circuit including front contact 255 of relay 3TPS, windings of relay 3TPS, front contact 254 of relay 3T, to (—).

The directional stick relay 3ES is controlled by the lever repeating relay 11SLP through back contact 46 as described in connection with Fig. 3. The signal controlling relay 11HR is normally de-energized, so that its back contact 90 completes the energizing circuit of the red lamp R of the signal 11.

To establish a route, with the system modified in accordance with Fig. 5, the operator moves the signal control lever such as the signal lever 11SL, to a proceed position subsequent to the proper positioning of the track switches in the route. This causes the energization of the preliminary route selecting circuit for the desired route including the relay 11SLP, for example, which opens back contact 46 and causes the directional stick relays for that route to be de-energized. When the lock relays in the route have been dropped away and the final route selecting circuit is completed, the relay 11RR is energized closing its front contact 187. This completes an energizing circuit for the relay 11HR from (+), through a circuit including front contact 251 of relay 3TPS, front contact 250 of relay 3T, front contact 187 of relay 11RR, front contact 188 of relay 11SLP, windings of relay 11HR, front contact 189 of relay 11SLP, to (—). The closure of front contact 90 energizes the green lamp G of signal 11.

We may now assume that a train accepts the signal 11 and enters upon the track section 3. This de-energizes the track relay 3T which is repeated by the relay 3TPS, as the front contact 254 included in its pick-up and stick circuits is opened. In other words, while the lever 11SL is in a proceed position and the relay 11SLP is picked up, the relay 3TPS is held energized by its stick circuit, which stick circuit is opened upon the passage of a train through the track section 3. The opening of front contact 250 of relay 3T causes the relay 11HR to be de-energized as well as the opening of front contact 251 of relay 3TPS, but the front contact 251 of relay 3TPS maintains the relay 11HR de-energized even after the train passes beyond the track section 3, as the closure of front contact 254 of relay 3T does not cause the relay 3TPS to be picked up unless the lever 11SL has been returned to a stop position allowing the closure of back contact 253 of relay 11SLP.

Thus, assuming that the lever 11SL has been left in a proceed position, the signal 11 is maintained "at-stop" upon the passage of a train by the relay 3TPS remaining de-energized. While the train is on the track section 3, the directional stick relay 3ES is maintained de-energized by reason of open front contact 47 but upon the passage of the train beyond the track section 3 over whatever route is established, the closure of front contact 47 allows the direction stick relay 3ES to be picked up by a circuit closed from (+), through a circuit including back contact 251 of relay 3TPS, front contact 47 of relay 3T, windings of relay 3ES, to (—).

In other words, the passage of the train through the track section 3 and over the remainder of the route allows the directional stick relays for that route to be successively picked up in the rear because of the closure of back contact 251 even though the signal lever for that route is in a proceed position and the back contact 46 of relay 11SLP is open.

This restoration of the directional stick relays for the route of course allows the picking up of the lock relays for the switches so that any pre-positioned switch levers may govern their switches in that route as soon as they are released and a preconditioned route may be automatically established even though the operator has not returned the signal lever for the first route to an "at stop" position.

In brief, the application of the relay 3TPS provides that the signal 11 is made a stick signal and when this stick feature is applied to a signal, the directional stick relays governed by that signal may be released upon the passage of a train through the route. It should be understood that the features of Fig. 5 may be applied to one or all of the signals of an interlocking plant, as disclosed in accordance with the present invention.

SUMMARY

The operation of an interlocking system provided in accordance with the present invention comprises in general the setting up of a route mechanically by operating the track switches to such positions, as desired, followed by the movement of the proper signal control lever to a clear or proceed position. The movement of the signal lever to a clear or proceed position causes the energization of its lever repeating relay providing a preliminary route selecting circuit is properly prepared by the switch repeating relays and the correspondence relays which require that the track switches in the desired route must be in correspondence with the switch control levers at that time. If the preliminary route selecting circuit is completed and the signal lever repeating relay is picked up, the directional stick relays for that route are de-energized successively, thereby locking all of the track switches in that route from operation by their switch lever.

When the track switches in the route have been locked, the final route selecting circuit is closed, which allows the signal controlling relay to be picked up subject to traffic conditions.

Once a route has been established by the clearing of its signal, the track switches in that route cannot respond to their switch levers, so that the switch levers may be moved to such positions, as desired, in order to precondition a second route. As the preliminary route selecting circuit for the route already cleared is only temporarily effective at the time of the clearing of that route, the change in the position of the switch levers and the de-energization of the correspondence relays does not effect the governing of the route already set up.

The passage of a train through the first route set up, beyond the point at which the second route conflicts therewith, allows the second route to be established by the clearing of its signal. This is made effective by either the putting to stop of the signal lever for the first route, or automatically upon the passage of a train putting such signal to stop and holding it "at-stop", either method of which may be employed in accordance with the present invention.

In other words, an interlocking system has been described which has route circuits corresponding to the actual track layout which circuits cannot be completed until the track switches in the route are in correspondence with their switch control levers and have been locked, although such locking occurs subsequent to the actuation of the signal control lever for that route.

In accordance with the present invention, each signal may be preferably provided with suitable approach locking means having associated therewith suitable time releasing means, as above pointed out, although such means have not been described in detail. Various other features employed in connection with approach locking and interlocking systems may be adapted to or employed with the present interlocking system proposed herein without effecting the scope of the present invention.

Having thus shown and described an interlocking system as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention except as limited by the appended claims.

What we claim is:

1. In a traffic controlling system for railroads; a track layout comprising a plurality of track switches for mechanically setting up a plurality of routes; signals for governing traffic over each of said routes, each of said signals being capable of giving stop or proceed indications; control levers for said track switches and said signals; a preliminary route circuit for each of said routes, a particular preliminary route circuit being closed by the signal lever for that route when and only when the track switches in that route and their respective control levers are in corresponding positions; means for locking the track switches in a particular route when said preliminary route circuit for that route has been closed; a final route circuit for each of said routes, a particular final route circuit being closed when and only when the track switches in that route are locked; and means for causing the signal for a particular route to indicate proceed when and only when said final route circuit for that route is closed, said means being independent of said preliminary route circuit if said preliminary route circuit has been momentarily energized, and said means being dependent upon said signal lever for that route.

2. In a traffic controlling system for railroads, a track layout comprising a plurality of track switches for setting up a plurality of mechanical routes through said track layout; signals for governing traffic over each of said routes, said signals normally indicating stop but being capable of indicating proceed; a switch lever for each of said track switches; a signal lever for each of said signals; a preliminary route circuit for each of said routes conforming to its mechanical counterpart, said preliminary route circuit for a particular route being closed by the signal lever for the corresponding route when and only when the track switches in that route are in positions corresponding to the positions of their respective switch levers; locking means for locking the track switches in a particular route when said preliminary route circuit for that route has been closed; a final route circuit for each of said routes conforming to its mechanical counterpart, said final route circuit for a particular route being closed by the signal lever for that route only after said preliminary route circuit for that route has been energized and the track switches in that route are locked by their respective locking means; and means for causing the signal for a particular route to indicate proceed, said means including its corresponding lever, when and only when said final route circuit for that route is closed, said means being independent of the corresponding preliminary route circuit for that route after the final route circuit for that route is closed.

3. In an interlocking system for railroads; a track layout containing a plurality of routes each including a plurality of track switches and track sections; switch levers for governing the operation of said track switches; a lock relay for each track switch; a plurality of route circuits, each corresponding to one of said routes, and each including a wire for each track section, a double throw circuit controller for each track switch assuming a position corresponding to the position of such track switch and the back contact of the lock relay associated with the track switch; and means energizing each particular route circuit by a current of the character depending on the direction in which traffic shall be permitted to travel over said route, said means being initially effective only if said track switches in that particular route are in positions corresponding to the positions of their control levers, but such means being capable to maintain such energization of such particular route circuit after it is initially energized independent of the correspondence of the track switch and their respective levers for that particular route.

4. In an interlocking system for railroads; a track layout including a plurality of track switches and track sections associated with said track switches to facilitate the establishment of a plurality of routes; switch control levers for said track switches for governing their operation; switch contacts for each track switch to manifest the position assumed by said track switch; a lock relay for each track switch, which, if deenergized, prevents power operation of such track switch in accordance with its respective switch control lever; a final route circuit for each of said routes including said switch contacts of those track switches included in said route, and also including back contacts of said lock relays of those switches included in such route; a stick relay for each final route circuit; a preliminary route circuit for energizing each stick relay; a contact on each stick relay for energizing its associated final route circuit by a current of a character depending on the direction in which traffic shall be permitted to move over said route, said preliminary route circuit being initially effective to accomplish such energization of such stick relay only when the track switches in that route are in positions corresponding to the positions of their respective switch levers; and a stick circuit for each stick relay closed independently of said preliminary route circuit.

5. In an interlocking system for railroads; a track layout including a plurality of track switches and track sections associated with such track switches to facilitate the establishment of a plurality of routes; switch control levers for said track switches for governing their operation, switch contacts for each track switch to manifest the position assumed by such track switch; a lock relay for each track switch which if deenergized prevents power operation of such track switch in accordance with its respective switch control lever; a route circuit for each of said routes including switch contacts of the track switches included in said routes and also including back contacts of the lock relays of the track switches included in said route; means for energizing said route circuit by current of a character depending upon the direction in which traffic shall be permitted to move over said route; means controlled by the switch contacts of those track switches included in the route for selecting the lock relays of such track switches; and manually operable means for deenergizing said selected lock relays, said means being initially effective only when the track switches included in the route are in positions corresponding to the positions of their respective switch levers.

6. In an interlocking system for railroads; a track layout including a plurality of track switches and track sections to facilitate the establishment of a plurality of routes; switch control levers for said track switches for governing their operation; switch contacts for each track switch to manifest the position assumed by each track switch; a lock relay for each track switch, which, if deenergized, prevents power operation of its track switch in response to its respective switch control lever; a route circuit for each of said routes including switch contacts of those track switches included in said route and also including back contacts of the lock relay for each of those switches included in said route; means controlled by the points of the track switches in a set up route for selecting the lock relays of such track switches; manually operable means for deenergizing said selected lock relays, said means being initially effective only when the track switches in such route are in positions corresponding to the positions of their respective control levers, whereby a route circuit may be manually closed; and a signal controlled by such route circuit.

7. In an interlocking system for railroads; a track layout containing a plurality of track switches for setting up a plurality of routes; power operating means for each of said track switches; switch control levers for governing the operation of said power operating means; a signal for each of said routes capable of giving stop and proceed indications; a signal lever for each of said signals and having stop and proceed positions; switch position contacts corresponding to the positions of said track switches; correspondence contacts for each track switch closed only when that track switch and its respective control lever are in corresponding positions; a plurality of preliminary route circuits, each corresponding to its respective mechanical route over said track layout and including said switch position contacts and said correspondence contacts of those track switches included in that route; means for energizing a particular preliminary route circuit only when said signal lever for that route is in a proceed position and said signal lever for the opposing route is in a stop position; relay means for each preliminary route circuit, a particular relay means being picked up upon the energization of a particular preliminary route circuit and maintained picked up independent of the energization of said preliminary route circuit so long as said signal lever for that route is in a proceed position; and means including said particular relay means for causing said signal for that particular route to give a proceed indication only when said relay means is picked up.

8. A railway switch and signal control system permitting levers to be pre-positioned to thereby precondition a second route conflicting with a first route already established but delaying the consummation of the second route until the first route ceases to conflict with the second route comprising; a plurality of track switches and signals for governing traffic thereover, whereby a plurality of routes may be established; control levers for said switches and signals; a plurality of preliminary route circuits one for each of said routes; a plurality of final route circuits, one for each of said routes; locking means for at times preventing operation of said track switches in response to their respective control levers; means establishing a particular preliminary route circuit only when the corresponding mechanical route is set up over said track switches and said track switches are in positions corresponding to the positions of their respective control levers; means energizing an established preliminary route circuit only when the signal control lever for that route is in a proceed position and the opposing signal control lever is in a stop position; means rendering the locking means for each track switch in a route effective to lock their respective track switches when the preliminary route circuit for that route has been energized; means establishing a final route circuit only when the corresponding mechanical route is set up over said track switches and said track switches in that route are locked by their respective said locking means and said preliminary route circuit for that route has been energized; means energizing an established final route circuit with current of a particular character depending upon the direction of traffic over said particular route; and means causing said signal for said particular route to give a proceed indication only when its final route circuit is energized.

9. In combination, a track layout containing a plurality of track switches for establishing a plurality of routes each including one or more of said track switches, a contact for each track switch reflecting the position of such track switch, a circuit for each route including a contact for each track switch and a wire for each stretch of track thereby conforming to such route, a relay at each end in such circuit, a lever at each end of such circuit for applying either current of one polarity to the end of said circuit or current of the opposite polarity between the relay associated with that end and such circuit whereby only one of the two relays of a particular circuit can be energized at one time, and a stick circuit for each of said relays.

10. A railway switch and signal control system permitting levers to be set to establish a second route conflicting with a set up route but delaying the consummation of the second route until the first route ceases to conflict with the second route comprising, a particular route circuit conforming to a particular route through the track layout, a second route circuit conforming to a second route but conflicting with said first route through the track layout, track switches in each of said routes, locking means for each track switch, levers for said track switches, contacts in said particular route circuit for each track switch in said particular route closed only if such lever and its track switch assume corresponding positions, a stick relay picked up in response to closure of said particular route circuit, a signal for governing traffic over such particular route, a circuit for controlling said signal closed only if all of the track switches in said particular route are locked by their locking means and said stick relay is energized, and means for each track switch responsive to a departing train which moves over such track switch for unlocking its respective locking means.

11. In an interlocking system for railroads, a track layout containing a plurality of routes each containing a plurality of track switches and track sections joining said track switches; a signal for governing traffic over each of said routes; a plurality of route circuits, each including a wire for each of said track sections and a double throw circuit controller for each of said track switches for the corresponding route; a control lever for each of said track switches for governing their operation; a signal lever for each route end; a stick relay for each route for energizing the corresponding established route circuit in response to a manual operation of the signal lever for that route, means rendering said stick relay in a particular route responsive to a signal lever for that route only when all the track switches for that route are in positions corresponding to the positions of their respective control levers; and means for holding such stick relay energized independently of such correspondence between track switches and their respective control levers.

12. In an interlocking system for railroads, a track layout containing a plurality of routes each containing a plurality of track switches and track sections joining said track switches; a signal for governing traffic over each of said routes; a plurality of route circuits, each including a wire for each of said track sections and a double throw circuit controller for each of said track switches for the corresponding route; a control lever for each of said track switches for governing their operation; a signal lever for each route; relay means for each route for energizing the corresponding established route circuit in response to a manual operation of the signal lever for that route, circuit means rendering said relay means in a particular route initially responsive to a lever for that route only when said track switches are in positions corresponding to the positions of their respective control levers; and means maintaining said relay means for a particular route responsive to said signal lever for that route independently of said circuit means after that relay means has responded.

13. In an interlocking system for railroads, a track layout containing a plurality of routes each containing a plurality of track switches and track sections joining said track switches; a wayside signal for governing traffic over each of said routes; a plurality of route circuits, each including a wire for each of said track sections and a double throw circuit controller for each of said track switches for the corresponding route; a control lever for each of said track switches for governing their operation; a signal lever for each route end; a stick relay for each route circuit for energizing the corresponding route circuit in response to a manual operation of the signal lever for that route; means requiring correspondence between said track switches and their respective control levers for a particular route before said stick relay for that route can be energized; means for holding such stick relay energized independently of such correspondence between track switches and their respective control levers; and means causing the way-side signal to be cleared for that route having its corresponding route circuit energized.

14. In combination, a circuit, a relay at each end of said circuit, a control lever at each end of said circuit and provided with normal and controlling positions, means operated by each of said levers for applying negative potential at its end of said circuit but excluding its said relay when such control lever is in a normal position and applying positive potential at its end of said circuit when such control lever is in a controlling position, whereby said circuit can be initially energized depending upon the position of both said control levers, means opening said circuit after it has been initially energized, and stick circuit means for each relay causing such relay to be wholly dependent upon its associated control lever when such relay is picked up and such control lever is in its controlling position.

15. In combination, a route circuit corresponding to a route through a track layout, a source of current, two manually controlled contacts one at each end of said route circuit for connecting that end of said route circuit to one terminal of said source when in one position and for connecting that end of said route circuit to the other terminal of said source when in its other position, electro-responsive means controlled by the initial energization of said circuit, and means controlled by said electro-responsive means for opening said circuit after it has been initially energized only providing the route through the track layout is maintained intact.

16. In combination, a circuit, a source of current, a manually controlled contact at each end of said circuit for connecting that end of said circuit to one terminal of said source when in one position and for connecting that end of said circuit to the other terminal of said source when in its other position, electro-responsive means controlled by the initial energization of said route circuit, means opening said circuit after it has been initially energized, and means maintaining said electro-responsive means energized dependent upon that one of said control contacts connecting said other terminal of said source to its end of said circuit.

17. In combination, a circuit, a source of current, a manually controlled contact at each end of said circuit for connecting that end of said circuit to one terminal of said source when in one position and for connecting that end of said circuit to the other terminal of said source when in its other position, contact selections included in said circuit for at times opening and at times closing said circuit, electro-responsive means initially controlled by the condition of energization of said circuit, and means maintaining said electro-responsive means energized dependent upon that one of said control contacts connecting said other terminal of said source to its end of said circuit and independent of said contact selections.

18. In combination, a route circuit associated with a route through a track layout, a source of current, a manually controlled contact at each end of said circuit for connecting that end of said route circuit to one terminal of said source when in one position and for connecting that end of said route circuit to the other terminal of said source when in its other position, contact selections included in said route circuit for at times opening and at times closing said route circuit in accordance with the conditions of the associated route through the track layout, a relay for each end of said route circuit and so included in said route circuit as to be initially picked up only when said route circuit is energized by said manually controlled contact at its respective end, and means associated with each of said relays for maintaining its relay energized dependent upon said manually controlled contact at its respective end and independent of said contact selections.

19. In combination with a trackway route, a route circuit associated with the route, a source of current, manually controlled contacts, one at each end of said circuit for connecting that end of said route circuit to one terminal of said source when in one position and for connecting that end of said route circuit to the other terminal of said source when in its other position, contacts included in said route circuit for at times opening and at times closing said route circuit depending upon the condition of the trackway route, a relay for each end of said route circuit and so included in said route circuit as to be initially picked up only when said route circuit is energized by said manually controlled contact at its respective end, and means associated with each of said relays for maintaining such relay energized dependent upon said manually controlled contact at its respective end and independent of said contacts, means responsive to the energization of either of said relays for deenergizing said route circuit, and traffic controlling means governed by said relays.

20. In combination, a track switch for setting up a plurality of routes, a detector track circuit for said track switch, a switch machine for operating said track switch, a switch control device for controlling said switch machine, a lock relay for when deenergized locking said switch machine against operation, a signal for governing traffic over said track switch, a route relay for when energized clearing said signal subject to traffic conditions ahead of said signal, a circuit for said route relay closed only if said switch machine and said control device have at least momentarily assumed corresponding conditions and said lock relay is deenergized, means for deenergizing said lock relay when said control device and said switch machine assume corresponding conditions and for reenergizing said lock relay when said track circuit has been occupied and vacated by a train.

21. In combination, a track switch for setting up a plurality of routes, a detector track circuit for said track switch, a switch machine for operating said track switch, a switch control device for controlling said switch machine, a lock stick relay for when deenergized locking said switch machine against operation, a signal for governing traffic over said track switch, a route relay for when energized clearing said signal subject to traffic conditions ahead of said signal, a circuit for said route relay closed only if said switch machine and said control device have at least momentarily assumed corresponding conditions and said lock stick relay is deenergized, a circuit for said lock stick relay including a contact at times opened when said switch machine is operated into correspondence with said control device, and a pick-up circuit for said lock stick relay closed only by occupancy followed by vacancy of said detector track circuit, whereby said control device may be operated to a new position after said route relay is energized and automatically set up a new route upon reenergization of said lock stick relay.

22. In an interlocking system for railroads; the combination with a track layout including a plurality of conflicting routes, each route having a plurality of track switches; a switch machine for each track switch; a control device for controlling each switch machine; a lock relay for each track switch which if deenergized prevents operation of the switch machine for that track switch; a stick relay for each route end; a route circuit for each route closed only when such route has been set up in the track layout, the lock relay for each track switch in said route is deenergized, and the stick relay for the entrance to such route is energized, means responsive to the closure of a route circuit to deenergize the lock relay for each track switch in that route, a pick-up circuit for a stick relay for a particular route closed only when that route is set up in the track layout and the control devices for that route assume positions corresponding to their respective track switches; a stick circuit for each stick relay closed independently of whether or not the control devices for the track switches in that route remain in correspondence with their respective track switches, whereby the control devices may be operated to tentatively set up a conflicting route; means responsive to the entrance of a train into said particular route and effective as such train passes each track switch in said particular route to energize the lock relay for that track switch to allow said conflicting route to be set up, and a signal at the entrance to each route controlled by the route circuit for that route.

23. In combination, a traffic route including a plurality of railway track switches, a signal at each end of the route to govern the movement of traffic in opposite directions over the route, manually controllable switch control means for controlling the operation of each switch of the route, a signal control means for each signal and normally assuming a position to hold its signal at stop and which signal can be cleared only so long as said signal control means assumes an operated position, a route relay for each signal, a pick-up circuit for each route relay closed when the associated signal control means is operated provided each switch of the route agrees as to position with its switch control means and the signal control means for the opposing signal is unoperated, a stick circuit for each route relay controlled by the associated signal control means only, and a circuit for clearing each signal controlled by each switch of the route and closed only when the associated route relay is energized and the route relay for the opposing signal is deenergized.

24. In combination, a traffic route including a plurality of railway track switches, two opposing signals including one at each end of the route to govern the movement of traffic in opposite directions over the route, manually controllable switch control means for controlling the operation of each switch of the route, a manually controllable signal control means for each signal and normally assuming a position to hold its signal at stop and which signal can be cleared only so long as said signal control means assumes an operated position, a route relay for each signal, a pick-up circuit for each route relay closed when the associated signal control means is actuated and the opposing signal control means is in its non-actuated condition provided each switch of the route agrees as to position with its switch control means, a stick circuit for each route relay controlled by the associated signal control means only, and a circuit for clearing each signal closed when the associated route relay is energized and the opposing route relay is deenergized provided the switches are positioned to establish said route and the clearing circuit for the opposing signal is deenergized.

25. In an interlocking system for railroads, a traffic route including a plurality of railway track switches, a signal to govern the movement of traffic over said route, a route relay for controlling said signal, a switch control relay for each switch, means controlled by each switch control relay for controlling the corresponding switch, a signal control means for each signal and normally assuming a position to hold its signal at stop and which signal can be cleared only so long as said signal control means assumes an operated position, a pick-up circuit for said route relay controlled by its signal control means and by the switch control relay for each switch of the route and closed only if said signal control means assumes its operated position and each switch control means assumes a position to establish said route, a stick circuit for said route relay controlled by the associated signal control means only and closed only if such signal control means assumes its operated position, and a circuit for clearing said signal controlled by each switch of the route and closed only when said switches are in position to establish said route and said route relay is energized.

26. In a centralized traffic control system for railroads, a track layout comprising two parallel tracks connected by a crossover, a plurality of signals including one for each direction for each track for governing the movement of traffic over different routes through said layout, switch control means for operating the switches of said crossover, a signal control means for each signal and normally assuming a position to hold its signal at stop and which signal can be cleared only so long as said signal control means assumes an operated position, a route relay for each signal for controlling such signal, a pick-up circuit for each route relay controlled by the corresponding signal control means and by said switch control means and closed only when the switches and the switch control means occupy corresponding positions and the position of the switches is such as to establish the route governed by the signal which such route relay controls, a stick circuit for each route relay controlled by the corresponding signal control means only, and means rendered effective when a route relay is energized to prevent the clearing of the opposing signal for the same route.

27. In an interlocking system for railroads, a track layout containing a plurality of routes each including a plurality of track switches and track sections joining said track switches, a signal for each of said routes for governing traffic thereover, a signal control lever for each of said signals, a switch control lever for each of said track switches, means for initially clearing a signal for a particular route in response to operation of said signal control lever to a signal clear position only when the switches for that route are in positions corresponding to their respective switch control levers but capable of maintaining such signal clear independently of such correspondence as by movement of switch control levers to set up a conflicting route and even though the signal control lever for such conflicting route is moved to the clear position, means locking the switches in that route having its signal cleared, automatic means for putting the signal for that route to stop upon the passage of a train into such route, means for unlocking the switches in that route after the passage of a train over said route dependent upon the putting to stop of the signal for that route by said automatic means and independently of the position assumed by said signal control lever for the first route, whereby said switches can respond to their control levers to set up the conflicting route and the signal for the conflicting route can clear if the first route has been put to stop automatically; whereby a railway switch and signal control system is provided which permits control levers to be prepositioned to thereby precondition a second route conflicting with a first route already established, which second route is automatically set up and the signal cleared therefor following the passage of a train over the first route and without requiring the signal control lever of the first route to be restored to its stop position.

OSCAR H. DICKE.
FOREST B. HITCHCOCK.